(12) United States Patent
Horie

(10) Patent No.: US 6,226,056 B1
(45) Date of Patent: May 1, 2001

(54) PLASMA ADDRESSED LIQUID CRYSTAL DISPLAY DEVICE HAVING CONDUCTOR THROUGH DIELECTRIC SHEET ATTACHED TO CONDUCTIVE LAYER CENTRALLY LOCATED IN DISCHARGE CHANNEL

(75) Inventor: Wataru Horie, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/121,904

(22) Filed: Jul. 24, 1998

(30) Foreign Application Priority Data

Jul. 28, 1997 (JP) .................................................. 9-201941
Oct. 3, 1997 (JP) .................................................. 9-271704

(51) Int. Cl.⁷ ...................................................... G02F 1/133
(52) U.S. Cl. ............................................................ 349/32
(58) Field of Search ................................................. 349/32

(56) References Cited

U.S. PATENT DOCUMENTS 5,764,001 * 6/1998 Khan et al. ........................... 313/582
5,909,260 * 6/1999 Ilcisin et al. ............................ 349/32

FOREIGN PATENT DOCUMENTS 4-313788    11/1992   (JP) .

* cited by examiner

*Primary Examiner*—Walter J. Malinowski
(74) *Attorney, Agent, or Firm*—Nixon & Vanderhye P.C.

(57) ABSTRACT

A plasma addressed liquid crystal display device includes a plasma cell substrate; a counter substrate; and a liquid crystal layer interposed between the plasma cell substrate and the counter substrate, the plasma cell substrate including a first substrate, a dielectric sheet provided on a side of the liquid crystal layer, and a plurality of stripe-shaped discharge channels surrounded by a plurality of partition walls formed in a gap between the first substrate and the dielectric sheet, the counter substrate including a second substrate, and a plurality of stripe-shaped electrodes formed on the second substrate so as to extend perpendicularly to the plurality of stripe-shaped discharge channels, and each of intersection regions of the plurality of discharge channels and the plurality of stripe-shaped electrodes defines a picture-element region, wherein the dielectric sheet includes a sheet-like dielectric, a plurality of conductive portions extending between surfaces of the sheet-like dielectric which respectively face the discharge channels and the liquid crystal layer, and a plurality of first conductive layers formed on a surface of the dielectric sheet which faces the discharge channels, each of the plurality of first conductive layers being electrically connected to at least one of the plurality of conducive portions.

14 Claims, 20 Drawing Sheets

PLASMA ADDRESSED LIQUID CRYSTAL DISPLAY DEVICE HAVING CONDUCTOR THROUGH DIELECTRIC SHEET ATTACHED TO CONDUCTIVE LAYER CENTRALLY LOCATED IN DISCHARGE CHANNEL

BACKGROUND OF THE INVENTION

1. Field of the Invention

The present invention relates to a liquid crystal display device, in particular to a plasma addressed liquid crystal display device (PALC). The present invention also relates to a dielectric sheet for separating a plasma switching section from a liquid crystal cell section of a PALC, and a method for producing the same.

2. Description of the Related Art

FIG. 26 is a perspective view of a conventional plasma addressed liquid crystal display device (PALC), and FIG. 27 is a cross sectional view thereof. The conventional plasma addressed liquid crystal display device will now be described with reference to FIGS. 26 and 27.

The plasma addressed liquid crystal display device includes two sections: a plasma switching section 1a and a liquid crystal cell section 1b. The plasma switching section (also referred to as a plasma cell substrate) 1a includes a glass substrate 4, a dielectric sheet 6, and a plurality of partition walls 5 formed between the glass substrate 4 and the dielectric sheet 6, and a plurality of plasma discharge channels (i.e., plasma generating region, plasma channel, or plasma cell) surrounded by the glass substrate 4, the dielectric sheet 6, and the plurality of partition walls 5. The liquid crystal section 1b includes a liquid crystal layer 7 and a counter substrate (also referred to as a color filter substrate in the case where it includes a color filter layer) 1b'. The liquid crystal layer 7 is interposed between the dielectric sheet 6 and the counter substrate 1b'. The counter substrate includes a glass substrate 10 and a plurality of strip electrodes 8 on a side of the liquid crystal layer 7. The counter substrate 1b' may include a color filter layer 9 having R, G and B color filters for conducting a color display.

In the plasma cell substrate 1a, alternating strips of anode electrodes 14 and cathode electrodes 12 are formed on the glass substrate 4 having a thickness of about 2 mm. The partition wall 5 for separating a plasma discharge channel 17 are formed on each of the anode electrodes 14. Prior to the formation of the anode electrodes 14 and the cathode electrodes 12, an underlying film 13 of, for example, an SiO$_2$-type material is formed on that surface of the glass substrate 4 on which the anode electrodes 14 and the cathode electrodes 12 are to be formed.

The dielectric sheet 6 for separating the plasma discharge channels 17 from the liquid crystal layer 7 is formed on the partition walls 5. Conventionally, a thin plate of glass is used as the dielectric sheet 6. After being evacuated into a vacuum state, each plasma discharge channel 17 between the partition walls 5 is filled with a rare gas (such as He and Ne) containing a small amount of Hg, in order to cause a plasma discharge in the plasma discharge channel 17.

In the counter substrate 1b', a black matrix 9a and a color filter layer 9 are formed on a glass substrate 10. On the color filter layer 9, strips of signal electrodes 8 of indium tin oxide (ITO) are formed substantially perpendicular to the partition walls 5.

Alignment films 15 and 16 (not shown in FIG. 26) are respectively applied on the opposing surfaces of the dielectric sheet 6 and the color filter layer 9 having the signal electrode 8 thereon. Then, the alignment films 15 and 16 are rubbed. The plasma cell substrate 1a and the counter substrate 1b' are attached to each other with a spacer (not shown) being provided either on the plasma cell substrate 1a or on the counter substrate 1b' for maintaining a prescribed cell gap (i.e., a thickness of a liquid crystal layer). At this time, the plasma cell substrate 1a and the counter substrate 1b' are attached to each other so that the respective rubbing directions are substantially perpendicular to each other. The gap between the plasma cell substrate 1a and the counter substrate 1b' is filled with a liquid crystal material, whereby the liquid crystal layer 7 is formed. Polarizing plates 3 and 11 are provided to the respective outer surfaces of the glass substrates 4 and 10 such that their polarization axes correspond to the respective rubbing directions. Accordingly, the polarization axes of the polarizing plates 3 and 11 are substantially perpendicular to each other. A surface-emitting backlight 2 is provided on the plasma cell substrate 1a side.

(Operation principle of plasma switching section)

The operation principle of the plasma switching section will now be described with reference to FIGS. 28 and 29. It should be noted that time periods (1) to (6) in FIG. 29 correspond to (1) to (6) in FIG. 28, respectively.

In the plasma addressed liquid crystal display device (PALC), the plasma discharge channels 17 in which a plasma discharge is caused are subjected to switched line-sequential scanning, and a data signal or an image signal is applied to the signal electrodes 8 in synchronization with the scanning, whereby display driving is conducted. When the anode electrodes 14 are connected to the ground and a negative pulse voltage is applied to the cathode electrodes 12, a plasma discharge occurs within the corresponding plasma discharge channel 17 (FIG. 28, (1)), and carriers (space charges) (ions/electron pairs) for writing data are produced. Accordingly, the plasma discharge channel 17 is rendered at the same potential as that of the anode electrode 14. Furthermore, an interface potential is produced at that surface of the dielectric sheet 6 which faces the plasma discharge channel 17, whereby a virtual electrode (not shown) is formed. When the application of the negative pulse voltage is discontinued after a prescribed time period, the plasma discharge is finished. However, the virtual electrode still remains at the same potential as that of the anode electrodes 14. When a data voltage corresponding to the data signal or the image signal is applied to the signal electrodes 8, the data voltage is divided according to the capacitance division ratio of the dielectric sheet 6 to the liquid crystal layer 7, whereby a prescribed image signal is applied (written) to the liquid crystal layer 7 (FIG. 28, (2)). When the plasma discharge is finished, the carriers will disappear over time, and the plasma discharge channel 17 will return to an insulating state. The accumulated charges corresponding to the image signal applied (written) to the liquid crystal layer 7 are retained until the next discharge occurs in response to the application of a negative pulse voltage (FIG. 28, (3)). By conducting the series of operations described above, display data corresponding to a single line is output from a liquid crystal driver to the signal electrodes 8 on a plasma discharge channel by plasma discharge channel basis. Thus, the data corresponding to a single line is written to the liquid crystal layer 7 at one time. In order to prevent degradation of the life of the liquid crystal material, the write operation to the liquid crystal layer 7 is conducted by alternating-current driving of the anode potential. Accordingly, data is written to the liquid crystal layer 7 with a polarity of the data voltage being inverted on a line by line basis. FIG. 28 further shows a plasma discharge (4), a data write operation (5) and a data retaining operation (6) in the case of the write operation conducted with polarity inversion. The operation principle in the case of (4), (5) and (6) is the same as that in the case of (1), (2) and (3) except that the polarity of the data voltage is inverted in (4), (5) and (6). The series of operations described above is sequentially conducted on the plasma discharge channel by plasma discharge channel basis, whereby an image corresponding to a single frame is displayed.

(Dielectric sheet)

The dielectric sheet 6 will now be described.

In the plasma addressed liquid crystal display device (PALC), light from the backlight 2 provided on the plasma cell substrate 1a side is modulated through a twisted nematic (TN) liquid crystal. Since the plasma addressed liquid crystal display device utilizes such a light modulation effect, the dielectric sheet 6 which is located therebetween should have an excellent transmission of visible light. Moreover, in order to prevent such disadvantages as crosstalk produced in the plasma-scanning direction, it is necessary that insulation is established between induced plasma-channel lines. Glass has been suitable as a material which satisfies these conditions. Japanese Laid-open publication No. 4-313788 proposes a method for solving these problems. According to this proposed technology, conductors are provided within a dielectric sheet so as to correspond to the pixels, and a transparent electrode pattern is formed on a pixel by pixel basis on that surface of the dielectric sheet which is in contact with a liquid crystal layer.

Conventional plasma addressed liquid crystal display devices including the above-mentioned proposed technology have the following problems:

(Surface stability of interface potential of virtual electrode)

When a plasma discharge occurs, an interface potential of the virtual electrode is produced at that surface of the dielectric sheet 6 which faces the plasma discharge channel 17, as described above. During the plasma discharge, the spacial charge distribution in the plasma discharge channel is not uniform. Therefore, the interface potential of the virtual electrode is adversely affected by the plasma discharge potential, making the surface charge distribution of the virtual electrode non-uniform and unstable. As a result, the surface uniformity of the voltage application to the liquid crystal layer 7 corresponding to the pixels is degraded, causing non-uniformity of the luminance. Consequently, the display becomes undesirable.

(Voltage applied to liquid crystal)

Voltage application to the liquid crystal layer is conducted by applying a voltage between the data electrodes (signal electrodes) of the counter substrate and the anode electrodes through the dielectric sheet of the plasma cell substrate. According to a capacitive coupling model, a voltage $V_{LC}$ applied to the liquid crystal layer is given by the following equation:

$$V_{LC}=V \cdot \epsilon_G \cdot d_{LC}/(\epsilon_G \cdot d_{LC}+\epsilon_{LC} \cdot d_G) \quad (1)$$

where V indicates a data voltage, $\epsilon_{LC}$ indicates a dielectric constant of the liquid crystal layer, $d_{LC}$ indicates a thickness of the liquid crystal layer, $\epsilon_G$ is a dielectric constant of the dielectric sheet and $d_G$ indicates a thickness of the dielectric sheet.

In the case where the following exemplary values: $\epsilon_{LC}=6.7$, $d_{LC}=6.0$ μm, $\epsilon_G=5.8$ and $d_G=50$ μm are substituted for the above equation (1), the following equation is obtained:

$$V_{LC}=0.094 \, V \quad (2)$$

It should be noted that the exemplary values mentioned above are values of a typical liquid crystal and a thin plate glass (dielectric sheet). Since the dielectric constant ($\epsilon_{LC}$) of the liquid crystal varies depending upon the voltage, the coefficient 0.094 of the data voltage V in the above equation (2) is a function of the voltage $V_{LC}$, making the calculation complicated.

(Crosstalk)

According to the operation principle of the plasma addressed liquid crystal display device, a data voltage corresponding to an image signal is applied to the liquid crystal layer 7 through the dielectric sheet 6. Accordingly, when the image signal is applied (written) to the liquid crystal layer 7, a charge pattern corresponding to the image signal is produced at the virtual electrode. Due to the thickness of the dielectric sheet 6 or the like, this charge pattern produced during the write operation expands in a lateral direction during the charge retaining operation. This lateral expansion adversely affects the adjacent pixels, causing crosstalk. Crosstalk reduces the pixel resolution and causes undesirable color mixture, thereby degrading the color reproduction capability.

(Data driver)

A liquid crystal driving voltage should be normally about 5 V. A data voltage of about 53 V is required in the above-mentioned example. Accordingly, a data driver consumes a large amount of power for a driving operation. Moreover, a semiconductor layer capable of withstanding a high voltage is required, making the driver expensive.

(Distortion of thin plate glass)

When the liquid crystal material is introduced a pressure on the liquid crystal layer side is 1 atm, while the rare gas within the plasma discharge channel has a low pressure of several tens of Torr. Moreover, the thin plate glass (dielectric sheet) having a small thickness is distorted between the partition walls, causing defective liquid-crystal orientation. Accordingly, the cell thickness varies within a pixel, whereby the retardation is shifted from its design value. As a result, the brightness and viewing-angle characteristics become undesirable.

(Handling of thin plate glass)

It can be seen from the above-mentioned relationship between $V_{LC}$ and V that the thinner glass is used, the higher data voltage is applied to the liquid crystal layer. This is advantageous in terms of the data voltage. However, reduction in the thickness of the glass is practically limited in terms of its strength. More specifically, the thinner glass is more fragile, causing a reduction in yield. This is not preferable from the production point of view.

(Numerical aperture)

The position of each conductor provided within the dielectric sheet corresponds to a pixel. Therefore, the numerical aperture of the pixel is reduced by the cross sectional area of the conductor.

SUMMARY OF THE INVENTION

According to one aspect of the present invention a plasma addressed liquid crystal display device includes a plasma cell substrate; a counter substrate; and a liquid crystal layer interposed between the plasma cell substrate and the counter substrate, the plasma cell substrate including a first substrate, a dielectric sheet provided on a side of the liquid crystal layer, and a plurality of stripe-shaped discharge channels surrounded by a plurality of partition walls formed in a gap between the first substrate and the dielectric sheet, the counter substrate including a second substrate, and a plurality of stripe-shaped electrodes formed on the second substrate so as to extend perpendicularly to the plurality of stripe-shaped discharge channels, and each of intersection regions of the plurality of discharge channels and the plurality of stripe-shaped electrodes defines a picture-element region, wherein the dielectric sheet includes a sheet-like dielectric, a plurality of conductive portions extending between surfaces of the sheet-like dielectric which respectively face the discharge channels and the liquid crystal layer, and a plurality of first conductive layers formed on a surface of the dielectric sheet which faces the discharge channels, each of the plurality of first conductive layers being electrically connected to at least one of the plurality of conducive portions.

In one example, the plurality of first conductive portions are provided so as to correspond to the respective picture-element regions.

In one example, the dielectric sheet has a plurality of second conductive layers on a surface of the dielectric sheet which faces the liquid crystal layer, the plurality of second conductive layers being provided so as to correspond to the respective picture element regions, and being electrically connected to the first conductive layer through at least one of the plurality of conductive portions.

In one example, the plurality of conductive portions are formed outside the picture element regions.

In one example, each of the plurality of conductive portions is formed in a region overlapping a corresponding one of the plurality of partition walls when viewed from a direction normal to the dielectric sheet.

In one example, first and second polarizing plates are provided on respective outside surfaces of the first and second substrates with respect to the liquid crystal layer.

In one example, a plasma addressed liquid crystal display device further includes at least one phase plate is provided between the first and second polarizing plates and the liquid crystal layer.

According to another aspect of the present invention, a dielectric sheet includes a sheet-like dielectric having first and second surfaces facing each other; a plurality of conductive portions extending between the first and second surfaces of the sheet-like dielectric; and a plurality of first conductive layers formed on at least one of the first and second surfaces, each of the plurality of first conductive layers being electrically connected to at least one of the plurality of conducive portions.

In one example, the sheet-like dielectric is formed from an inorganic material.

In one example, the sheet-like dielectric is formed from a resin.

According to still another aspect of the present invention, a method for producing a dielectric sheet including a sheet-like dielectric having first and second surfaces facing each other, and a plurality of conductive portions extending between the first and second surfaces of the sheet-like dielectric includes the steps of: melting the sheet-like dielectric; introducing regularly-arranged metal wires from the first surface into the second surface of the melted sheet-like dielectric and cutting a portion of the metal wires which projects from the sheet-like dielectric, thereby forming the plurality of conductive portions; and polishing the first and second surfaces of the sheet-like dielectric in order to smooth the first and second surfaces.

According to yet another aspect of the present invention, a method for producing a dielectric sheet including a sheet-like dielectric having first and second surfaces facing each other, and a plurality of conductive portions extending between the first and second surfaces of the sheet-like dielectric includes the steps of: regularly arranging metal grains for forming the plurality of conductive portions; filling a gap between the regularly-arranged metal grains with dielectric powder; and compressing the metal grains and the dielectric powder in a melted state to form the dielectric sheet having a uniform thickness.

According to yet another aspect of the present invention, a method for producing a dielectric sheet including a sheet-like dielectric having first and second surfaces facing each other, and a plurality of conductive portions extending between the first and second surfaces of the sheet-like dielectric includes the steps of: melting the sheet-like dielectric; and regularly implanting metal grains into the melted sheet-like dielectric to form the plurality of conductive portions.

According to yet another aspect of the present invention, a method for producing a dielectric sheet including a sheet-like dielectric having first and second surfaces facing each other, and a plurality of conductive portions extending between the first and second surfaces of the sheet-like dielectric includes the steps of: forming a metal electrode on the first surface of the sheet-like dielectric and forming a non-metal electrode on the second surface thereof; melting the sheet-like dielectric; and applying a voltage between the metal electrode and the non-metal electrode using the metal electrode as a positive electrode to cause a metal forming the metal electrode to migrate from the first surface to the second surface of the melted sheet-like dielectric, thereby forming the plurality of conductive portions.

According to a dielectric sheet of the present invention, a conductive portion having a conductivity in a thickness direction of a dielectric sheet is continuously or discontinuously formed in the dielectric sheet. Moreover, at least one end of the conductive portion is electrically connected to a strip-shaped conductive film formed with a prescribed width on a surface of the dielectric sheet. Therefore, in the case where the conductive film is located on a plasma discharge channel side, charges are uniformly distributed at a virtual electrode, and the surface uniformity of the voltage application to a liquid crystal layer corresponding to the pixels can be achieved. Accordingly, a surface distribution of the luminance in the plasma addressed liquid crystal display device is eliminated. It is preferable that the conductive film which is electrically connected to the conductive portion is provided to have a large area in each pixel in a plasma addressed liquid crystal panel or the like. It is more preferable that the conductive film has substantially the same area as that of a pixel.

Therefore, in a plasma addressed liquid crystal display device using this dielectric sheet, non-uniformity of the luminance causing an undesirable display is eliminated, whereby the display quality is improved. Moreover, a sufficient contrast ratio can be achieved by driving the liquid crystal even with a low voltage. As a result, a less expensive driver can be used.

Furthermore, a data voltage corresponding to an image signal is applied to the liquid crystal layer through the conductive film formed on the plasma discharge channel side of the dielectric sheet, instead of through a charge pattern formed at the virtual electrode. As a result, crosstalk resulting from the lateral expansion of the charge pattern is eliminated.

A plasma addressed liquid crystal display device of the present invention includes a plate-shaped or bar-shaped dielectric having a conductivity in the thickness direction thereof, wherein the dielectric includes a regular arrangement of conductive regions and insulating regions, the conductive regions having a conductivity in the direction perpendicular to that of the dielectric. The conductive regions must have a low resistance. The conductive regions are usually made of a non-light transmissive metal material. The conductive regions are provided corresponding to partition walls, and are connected to transparent electrodes corresponding to the pixels. In other words, the conductive regions are connected to non-aperture regions, whereby a reduction in the numerical aperture is prevented. It should be noted that the dielectric can be formed from an anisotropic conductive glass. In the case of a reflection-type plasma addressing liquid crystal display device, pixel electrodes may be opaque.

In order to expose the conductive regions extending in the thickness direction of the dielectric to the plasma discharge channels, notches may be formed at corresponding portions of the partition walls.

A plasma addressed liquid crystal display device of the present invention may alternatively include a plate-shaped or bar-shaped dielectric having a conductivity in the thickness direction thereof, wherein the dielectric includes a regular arrangement of conductive regions and insulating regions, the conductive regions having a conductivity in the direction perpendicular to that of the dielectric, and electrodes corresponding to the conductive regions are patterned on both surfaces of the dielectric. Accordingly, charges are uniformly distributed at a virtual electrode, whereby surface uniformity of the voltage application to a liquid crystal corresponding to the pixels can be achieved. As a result, non-uniformity of the luminance is eliminated in the plasma addressed liquid crystal display device, achieving a sufficient contrast.

Thus, the invention described herein makes possible the advantages of (1) providing a dielectric sheet capable of eliminating the surface instability of a virtual electrode and also capable of reducing a liquid crystal driving voltage, a method for producing the same, and a plasma addressed liquid crystal display device using the same, and (2) providing a plasma addressed liquid crystal display device including a dielectric sheet having a sufficient strength without degrading the numerical aperture, and a method for producing the dielectric sheet.

These and other advantages of the present invention will become apparent to those skilled in the art upon reading and understanding the following detailed description with reference to the accompanying figures.

BRIEF DESCRIPTION OF THE DRAWINGS

FIGS. 4A through 4C are diagrams illustrating a method for producing a dielectric sheet according to Example 3 of the present invention, wherein FIG. 4A is a plan view of metal wires, FIG. 4B is a front view of the metal wires and a sheet-like dielectric, and FIG. 4C is a front view of the metal wires protruding from the sheet-like dielectric;

FIGS. 6A through 6C are diagrams illustrating a method for producing a dielectric sheet according to Example 5 of the present invention, wherein FIG. 6A is a plan view of a mask, FIG. 6B is a cross sectional view of the mask and a dielectric plate main body, and FIG. 6C is a cross sectional view of a produced dielectric sheet;

FIGS. 7A and 7B are diagram illustrating a method for producing a dielectric sheet according to Example 6 of the present invention, wherein FIG. 7A is a plan view of a sheet-like dielectric and FIG. 7B is a front view of the sheet-like dielectric interposed between metal electrodes and carbon electrodes;

FIGS. 22A through 22C are diagrams illustrating a method for producing a dielectric sheet according to Example 14 of the present invention, wherein FIG. 22A is a front view of metal views and a dielectric, FIG. 22B is a front view of metal wires protruding from the dielectric, and FIG. 22C is a top plan view of a produced dielectric sheet;

FIGS. 24A through 24C are diagram illustrating a method for producing a dielectric sheet according to Example 16 of the present invention, wherein FIG. 24A is a cross sectional view of a mask and a dielectric, FIG. 24B is a cross sectional view of a produced dielectric sheet, and FIG. 24C is a top plan view of a produced dielectric sheet;

FIGS. 25A and 25B are diagrams illustrating a method for producing a dielectric sheet according to Example 17 of the present invention, wherein FIG. 25A is a diagram of a melted dielectric interposed between a metal electrode and a carbon electrode, and FIG. 25B is a top plan view of the produced dielectric sheet;

DESCRIPTION OF THE PREFERRED EMBODIMENTS

Hereinafter, the present invention will be described by way of illustrative examples with reference to the accompanying drawings.

Figure 26:
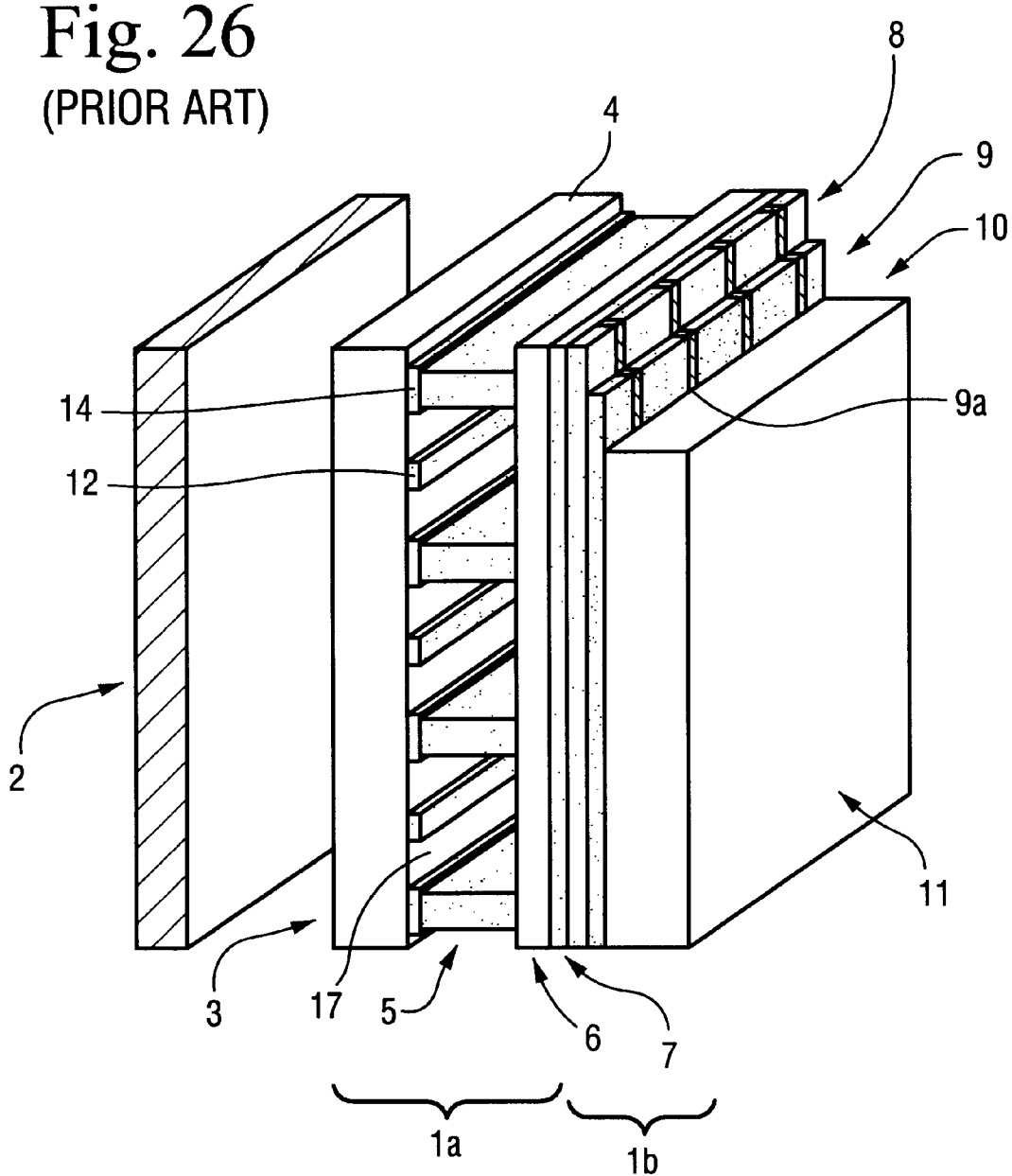
FIG. 26 is a perspective view of a conventional plasma addressing liquid crystal display device (PALC)
Figure 27:
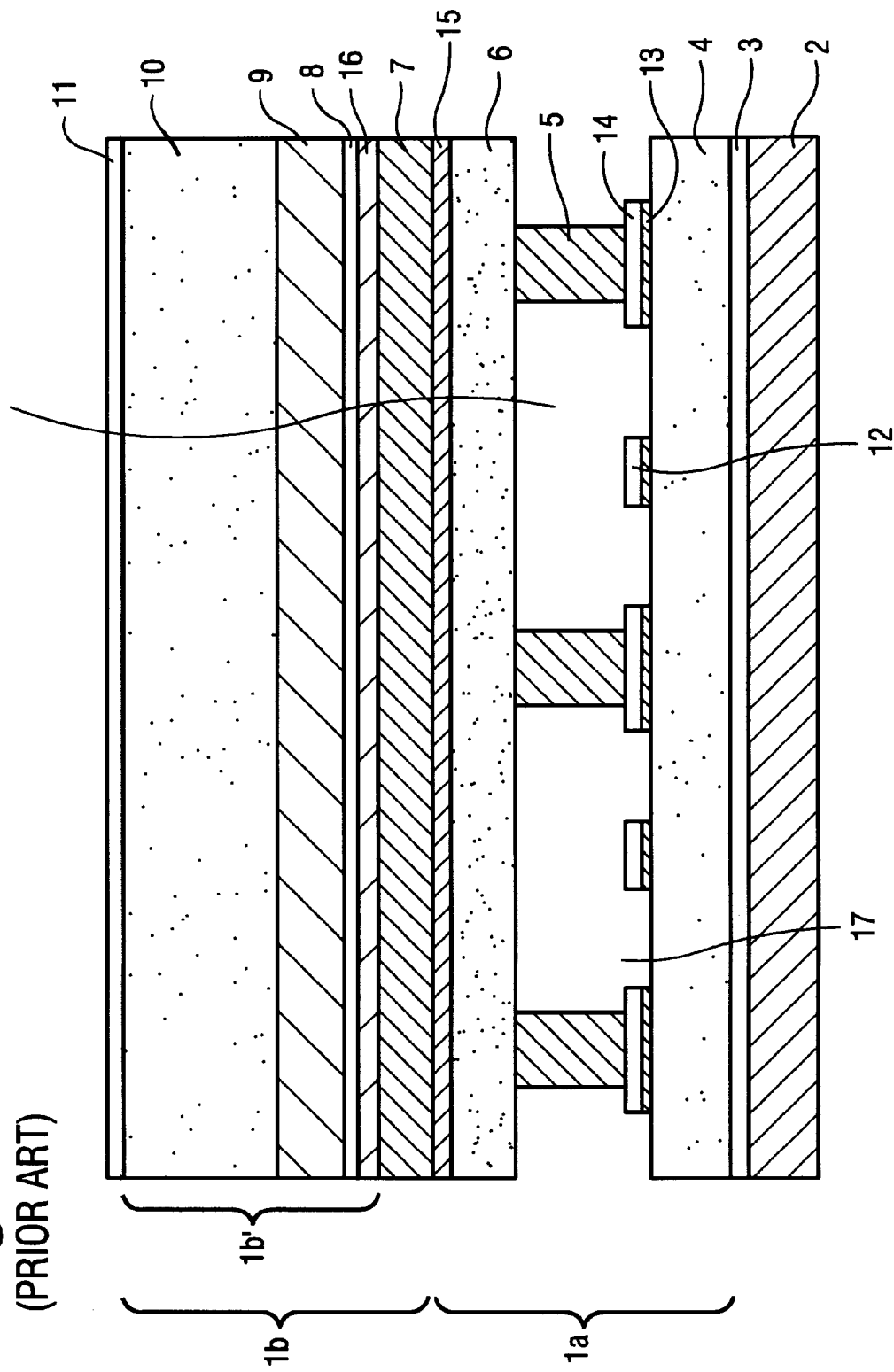
FIG. 27 is a cross sectional view of the conventional plasma addressing liquid crystal display device (PALC)
Figure 28:
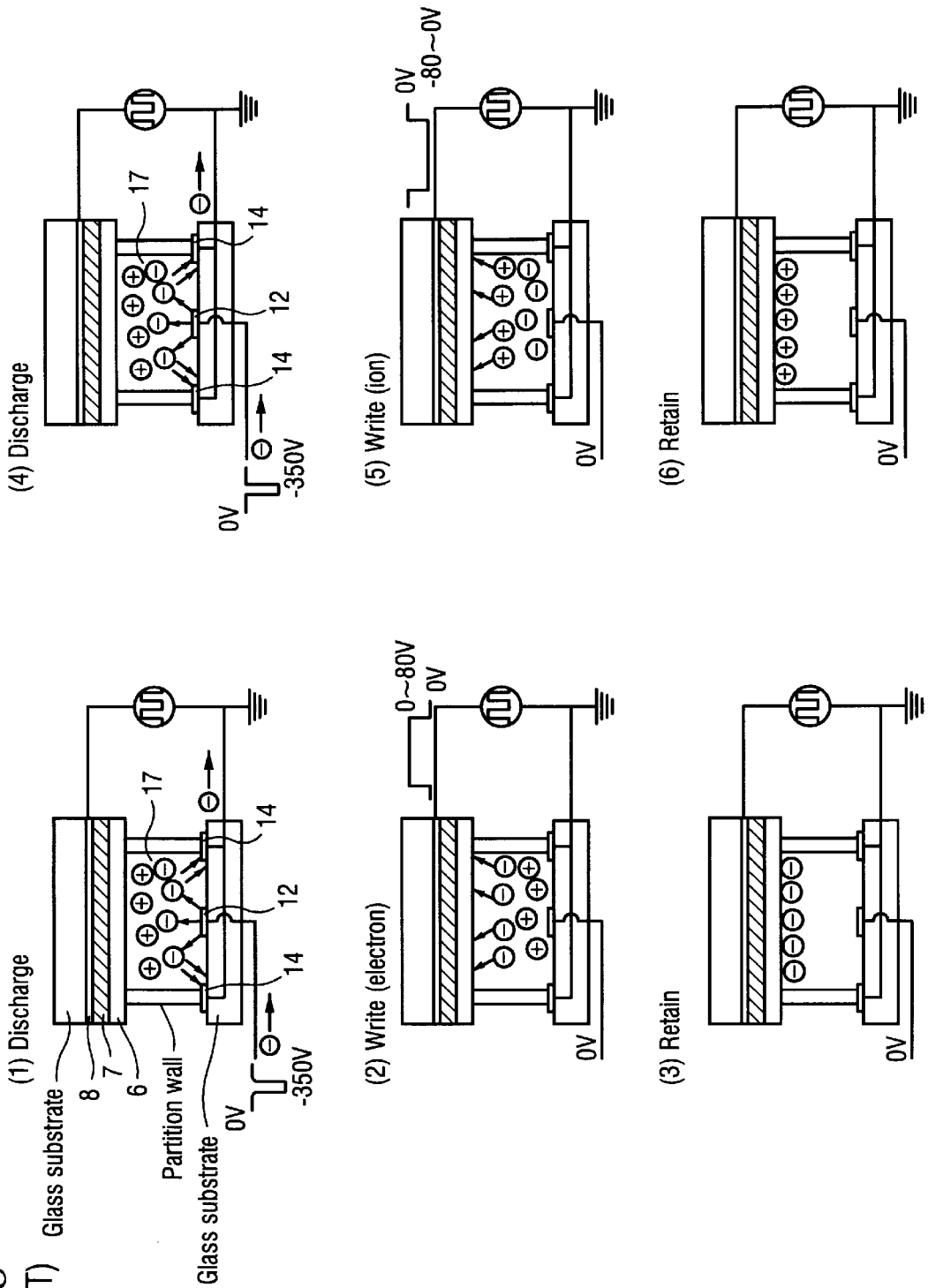
FIG. 28 is a diagram illustrating the operation principle of a plasma cell substrate.
Figure 29:
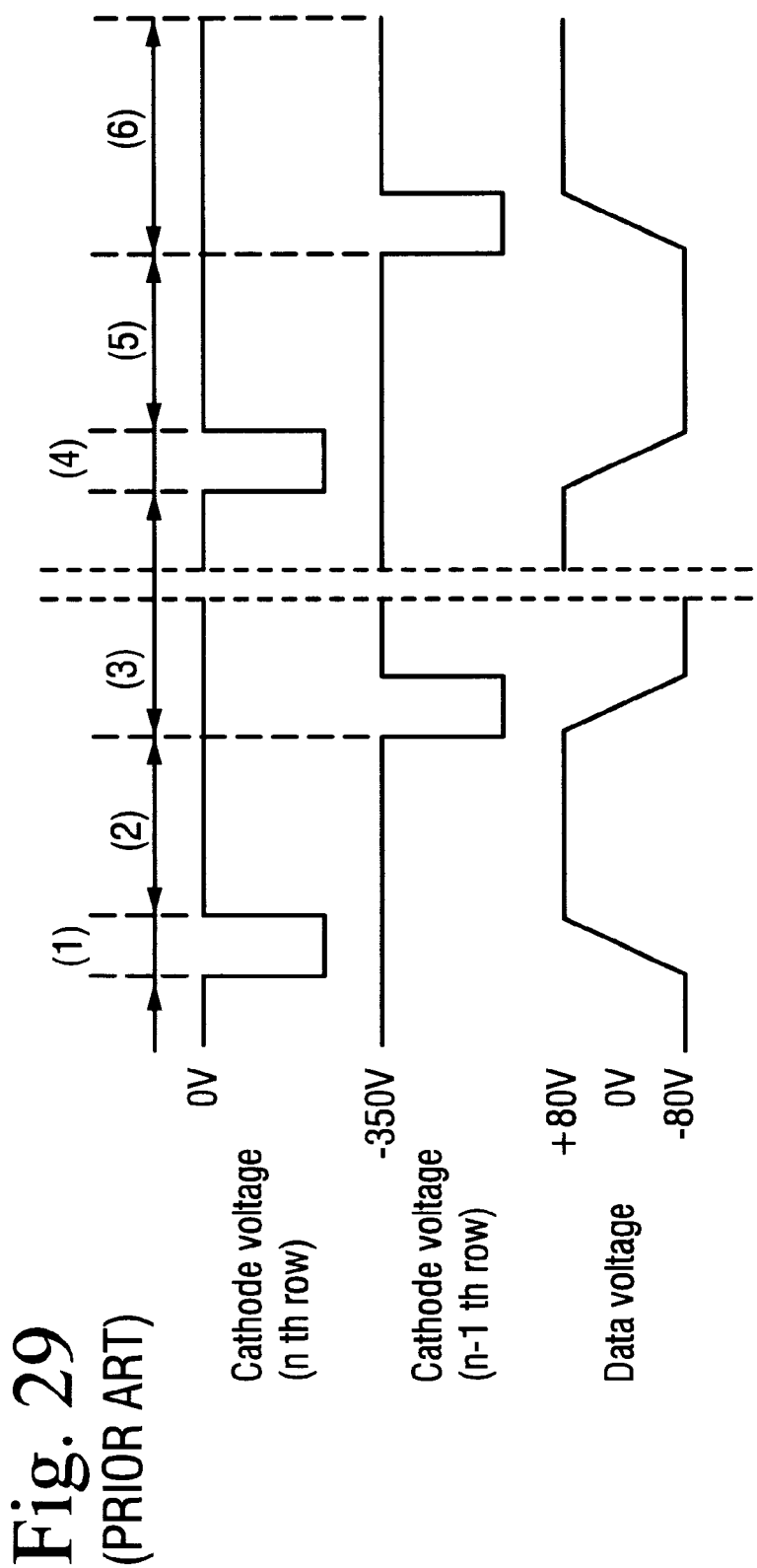
FIG. 29 is a diagram illustrating the operation principle of the plasma cell substrate.

First, examples of a dielectric sheet will be described. In the following examples, the same reference numerals and characters as those in FIGS. 26 and 27 denote the same parts. It should be noted that the term "conductive" herein means "electrically conductive" in the following examples unless otherwise mentioned.

Example 1

Figure 1A:
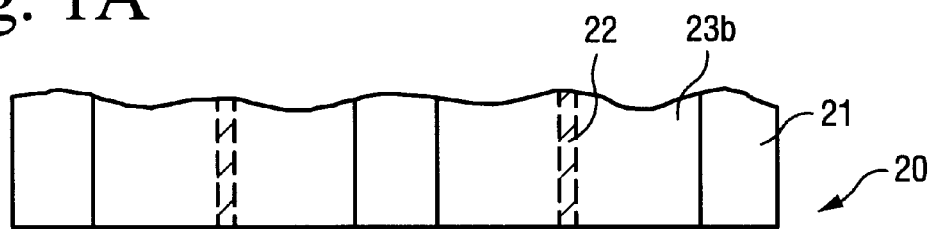
FIG. 1A is a partial plan view of a dielectric sheet according to Example 1 of the present invention.
Figure 1B:
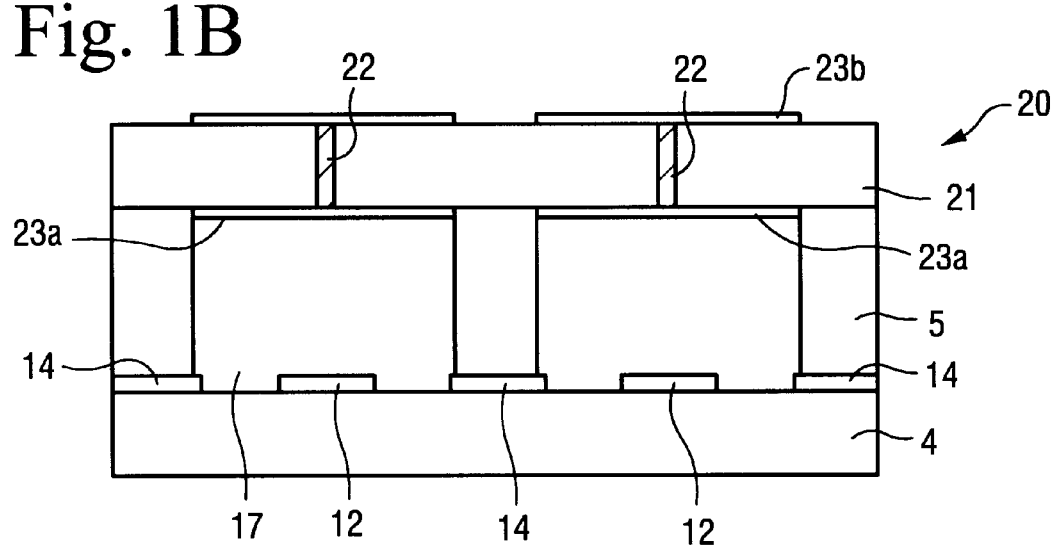
FIG. 1B is a cross sectional view of the dielectric sheet according to Example 1 of the present invention.

FIGS. 1A and 1B show a dielectric sheet according to Example 1 of the present invention. FIG. 1A is a partial plan view of the dielectric sheet, and FIG. 1B is a cross sectional view thereof. It should be noted that FIG. 1B shows not only the dielectric sheet of the present invention but also a plasma cell substrate.

In the dielectric sheet 20, a conductive portion 22 is provided through a sheet-like dielectric 21 (e.g., a glass sheet melted at a temperature of about 600° C.) in the thickness direction of the sheet-like dielectric 21 so as to correspond to each plasma discharge channel 17. Each conductive portion 22 is formed by, for example, introducing a metal within the sheet-like dielectric 21. Furthermore, indium tin oxide (ITO) is deposited by a vapor deposition method from both sides of the sheet-like dielectric 21. Then, using the photolithography technology, the ITO deposited on both sides of the sheet-like dielectric 21 is patterned in the direction toward cathode electrodes 12 so as to correspond to each plasma discharge channel 17. The resultant strips of conductive films 23a and 23b of ITO are electrically connected to both ends of the conductive portion 22, respectively. The conductive film 23a is located on the plasma discharge channel 17 side, whereas the conductive film 23b is located on the other side. In order to achieve a uniform charge distribution, it is preferable that at least the conductive film 23a on the plasma discharge channel 17 side is provided to have a large area in each pixel in a plasma addressed liquid crystal panel or the like. It is more preferable that the conductive film 23a has substantially the same area as that of a pixel. This is also applied to the examples described below.

Figure 2A:
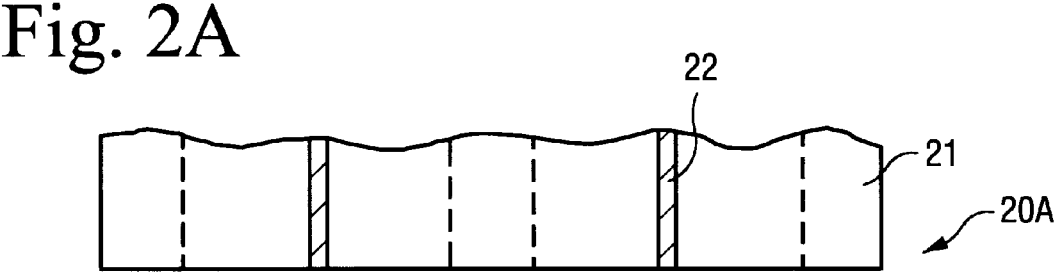
FIG. 2A is a partial plan view of another dielectric sheet according to Example 1 of the present invention.
Figure 2B:
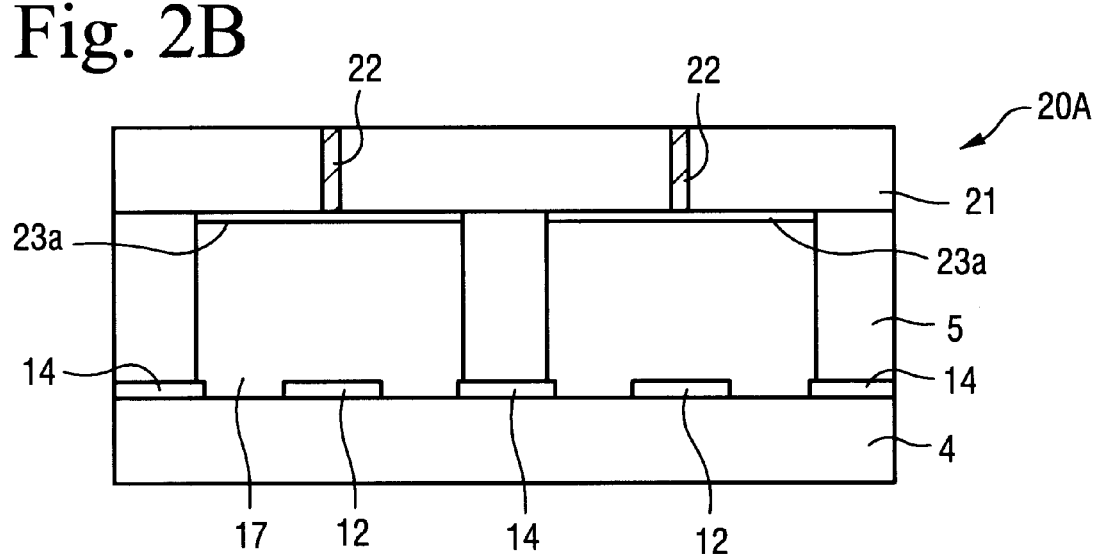
FIG. 2B is a cross sectional view of the another dielectric sheet according to Example 1 of the present invention.

Instead of the dielectric sheet 20, a dielectric sheet 20A having only the conductive film 23a as shown in FIGS. 2A and 2B is also possible. In other words, the dielectric sheet 20 may alternatively be such a dielectric sheet that has a conductive film only on one side of the sheet-like dielectric 21. In such a case, the conductive film 23a is provided on each plasma discharge channel 17 side of the sheet-like dielectric 21, as shown in FIG. 2B.

Example 2

Figure 3A:
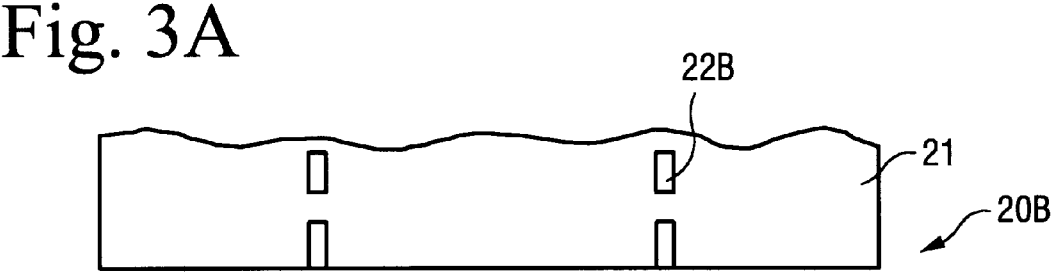
FIG. 3A is a partial plan view of a dielectric sheet according to Example 2 of the present invention.
Figure 3B:
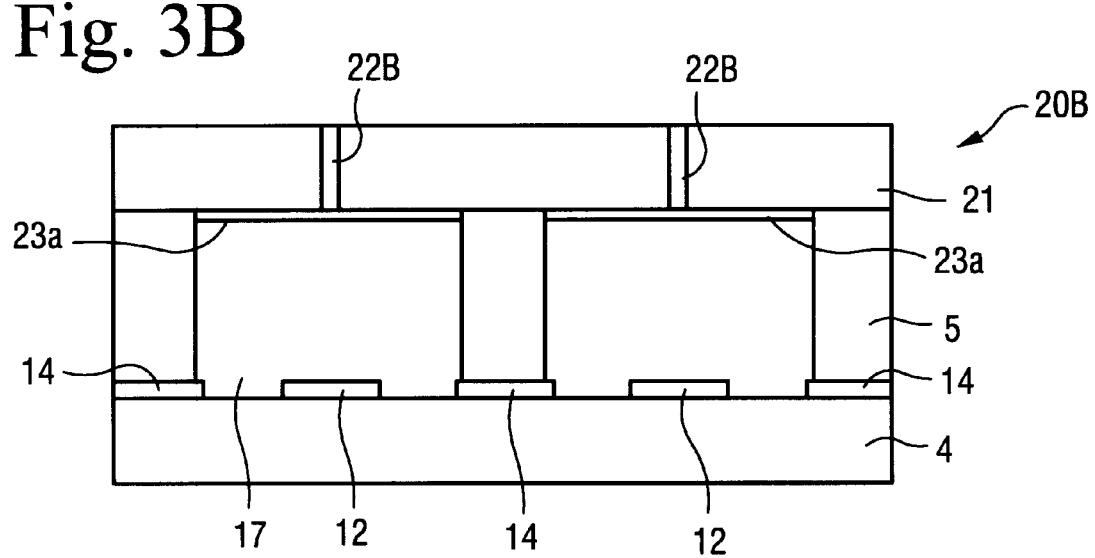
FIG. 3B is a cross sectional view of the dielectric sheet according to Example 2 of the present invention.

FIGS. 3A and 3B show a dielectric sheet according to Example 2 of the present invention. FIG. 3A is a partial plan view of the dielectric sheet, and FIG. 3B is a cross sectional view thereof.

In the dielectric sheet 20B, a conductive portion 22B is provided through a sheet-like dielectric 21 in the thickness direction of the sheet-like dielectric 21 so as to correspond to each plasma discharge channel 17. The conductive portions 22B are formed by, for example, introducing a metal within the sheet-like dielectric 21. The conductive portions 22B extend toward cathode electrodes 12 so as to correspond to the pixels. In other words, while the conductive portion 22 of Example 1 is formed continuously as viewed in the partial plan view of FIG. 1A, the conductive portion 22B of Example 2 is discontinuously formed as viewed in the partial plan view of FIG. 3A. One end of each conductive portion 22B is electrically connected to the respective conductive film 23a of indium tin oxide (ITO) which has been formed in a similar manner to that of Example 1.

The length of the conductive portion 22B as viewed in the plan view may be either longer or shorter than that shown in FIG. 3A. In other words, the conductive portion 22B may have any length as long as at least one conductive portion 22B is present in each pixel.

Although only the conductive film 23a is provided in FIG. 2B, the conductive film 23b may additionally be provided on the other side of the sheet-like dielectric 21 as in the case of Example 1.

Hereinafter, a method for producing a dielectric sheet according to the present invention will be described.

Example 3

Figure 4A:
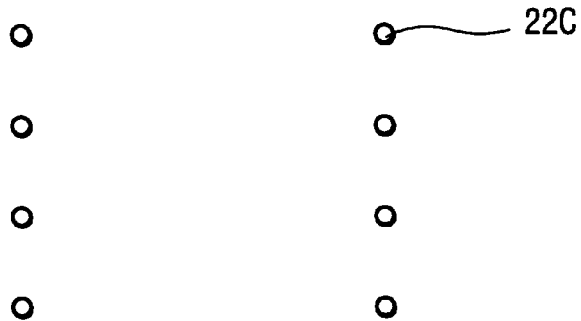
Figure 4B:
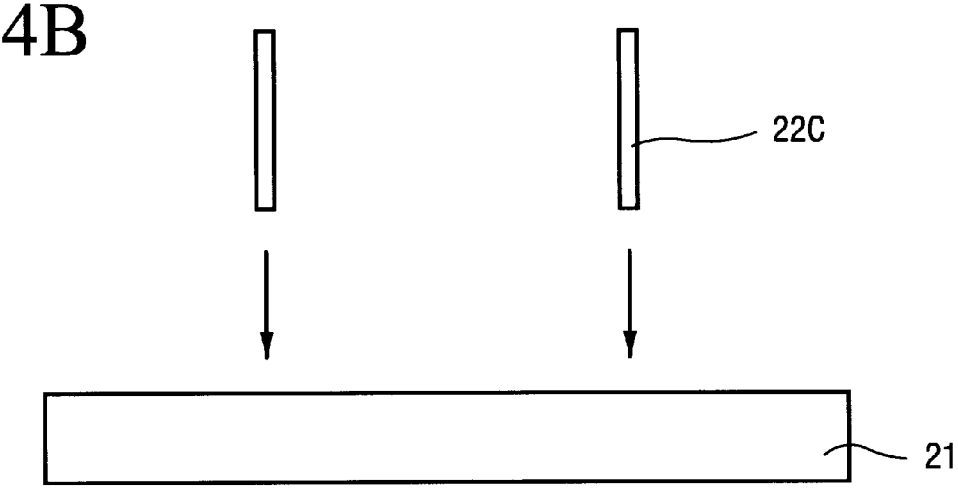
Figure 4C:
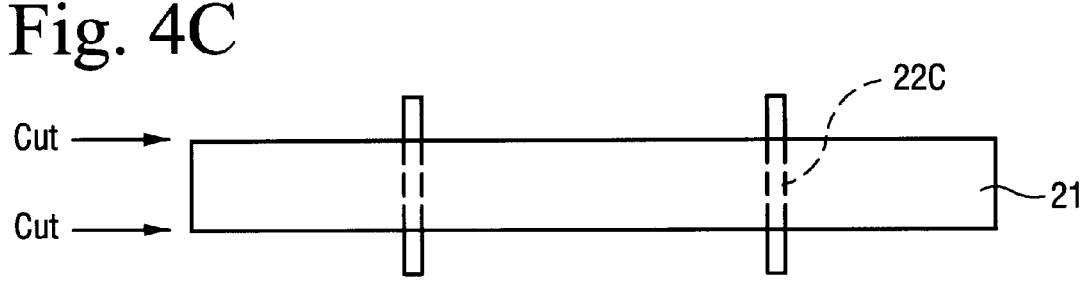

FIGS. 4A through 4C are diagrams illustrating a method for producing a dielectric sheet according to Example 3 of the present invention.

First, metal wires 22C (e.g., a thin wire made of gold and having a diameter of about 30 µm) for conductive portions are arranged vertically to a surface of a sheet-like dielectric 21 so that at least one metal wire 22C is present for each pixel, as shown in a plan view of FIG. 4A. The metal wires 22C are securely held by an appropriate jig.

Next, a sheet-like dielectric 21 is melted by heating. In this state, the set of metal wires 22C are introduced to extend through the sheet-like dielectric 21, as shown in a front view of FIG. 4B. Then, a portion of the metal wires 22C which protrudes from a surface of the sheet-like dielectric 21 is cut, as shown in a front view of FIG. 4C. Thereafter, both surfaces of the sheet-like dielectric 21 are polished to make these surfaces flat.

Example 4

Figure 5:
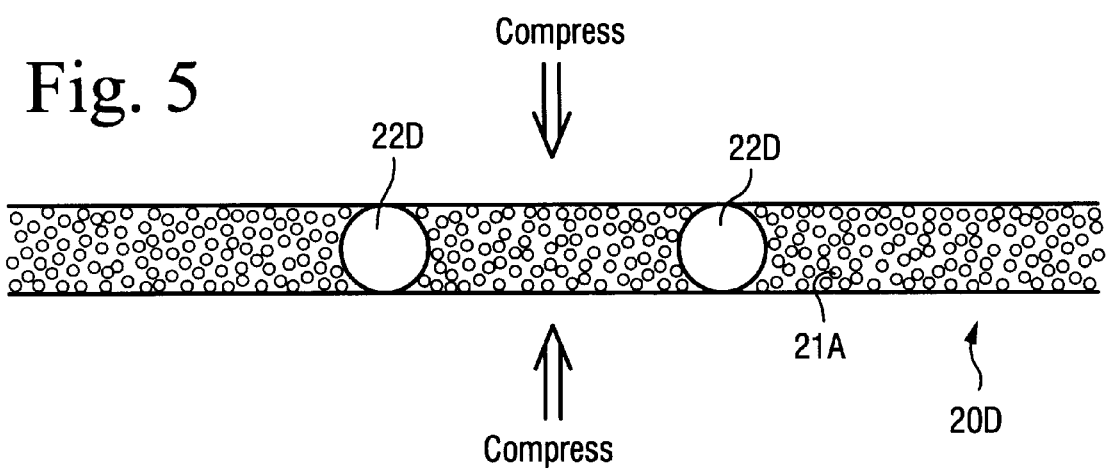
FIG. 5 is a diagram (front view) illustrating a method for producing a dielectric sheet according to Example 4 of the present invention.

FIG. 5 is a diagram (front view) illustrating a method for producing a dielectric sheet according to Example 4 of the present invention.

First, metal grains 22D (e.g., a particle having a diameter of about 50 µm) for conductive portions are regularly arranged such that at least one metal grain 22D is present for each pixel.

Next, a gap between the metal grains 22D is filled with glass powder 21A for a sheet-like dielectric. As the glass powder, for example, $PbO \cdot B_2O_3$ type glass powder can be used, whereas other types of dielectric powder can alternatively be used. The resultant metal grains and glass powder are compressed at a high temperature (about 500° C.) to a desired thickness. Thus, a dielectric sheet 20D of Example 4 is produced.

Example 5

Figure 6A:
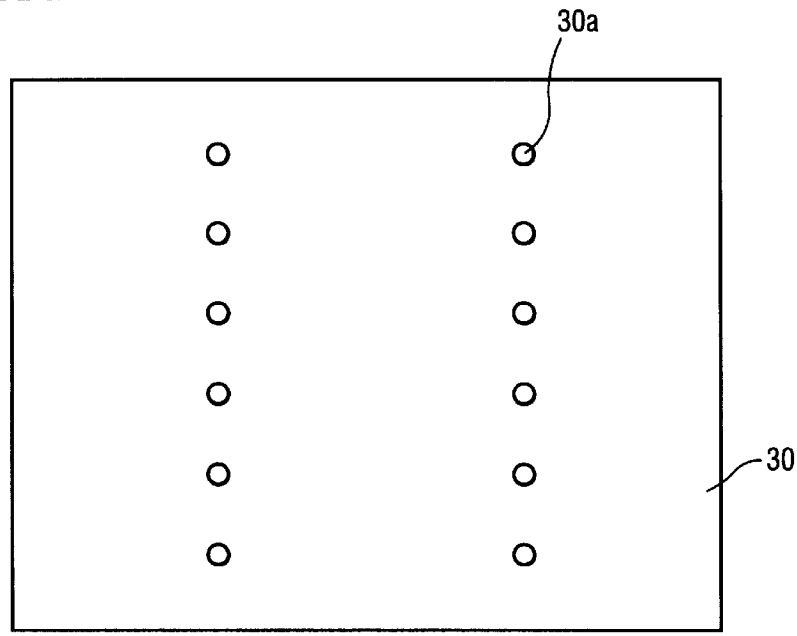
Figure 6B:
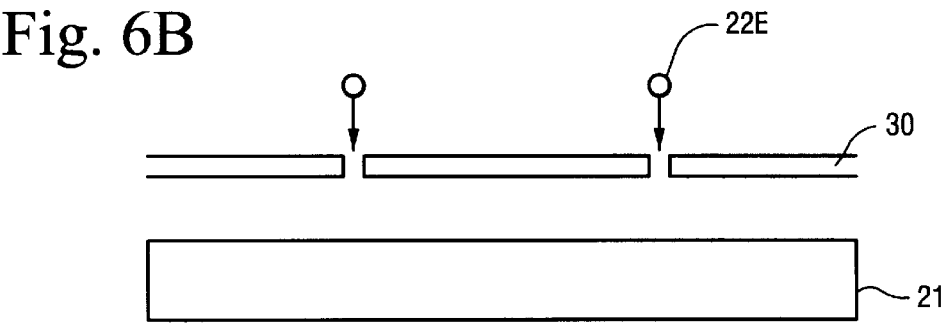
Figure 6C:
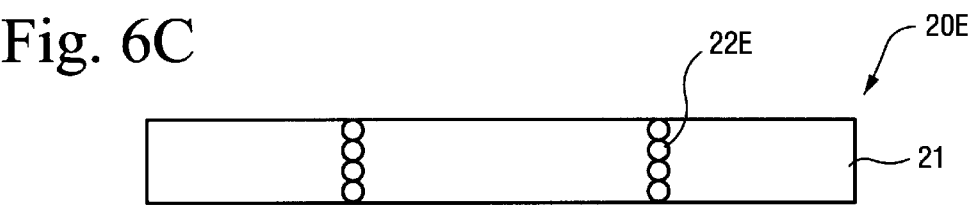

FIGS. 6A through 6C are diagrams illustrating a method for producing a dielectric sheet according to Example 5 of the present invention.

First, a mask 30 having regularly arranged openings 30a, as shown in a plan view of FIG. 6A, is produced by etching or the like. These openings 30a are sufficiently smaller than the pixel size.

Then, the mask 30 is set to a sheet-like dielectric 21 of a glass plate, as shown in a front cross sectional view of FIG. 6B. At this time, the sheet-like dielectric 21 has been melted by heating. In this state, metal grains 22E (e.g., a particle having a diameter of about 50 $\mu$m) for conductive portions are ejected from a cylinder into the sheet-like dielectric 21.

Thus, a dielectric sheet 20E of Example 5 including the conductive portions formed from the metal grains 22E is obtained, as shown in a cross sectional view of FIG. 6C.

Example 6

Figure 7A:
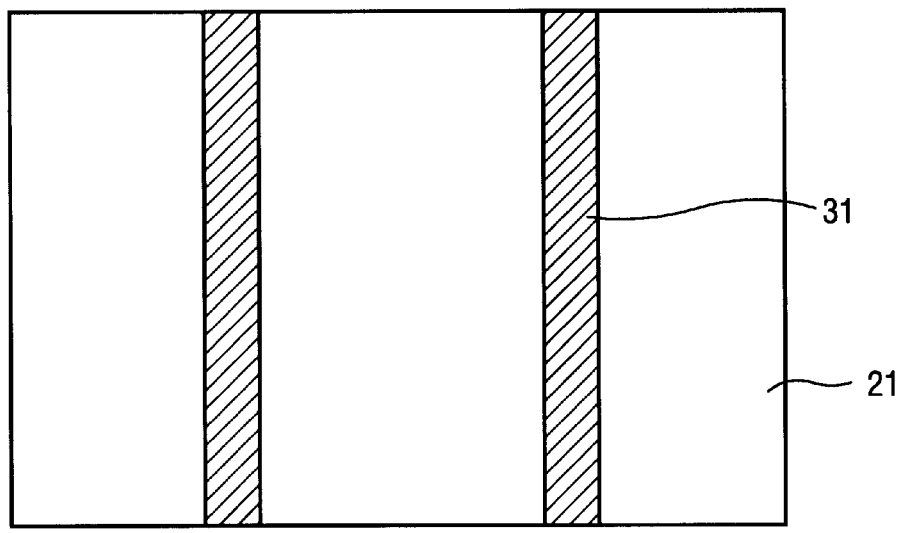
Figure 7B:
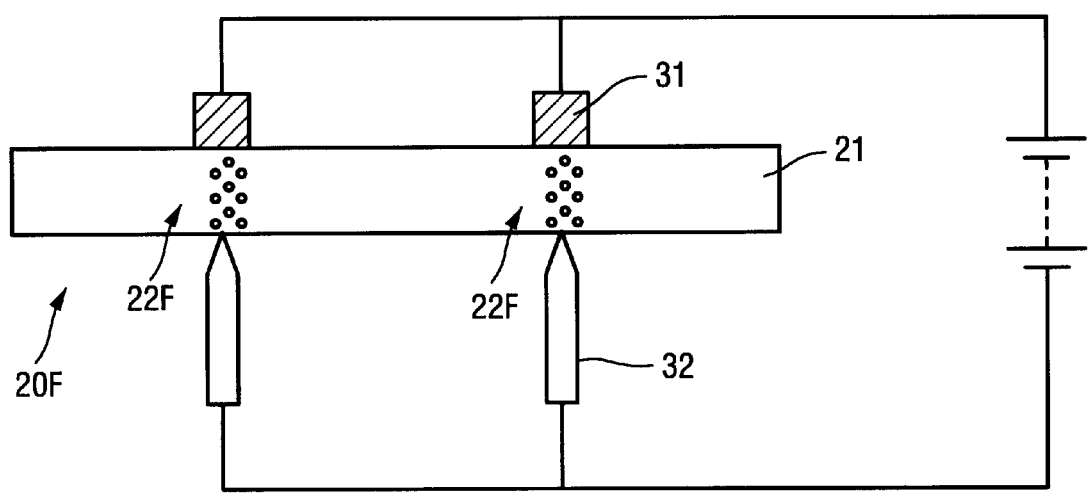

FIGS. 7A and 7B are diagrams illustrating a method for producing a dielectric sheet according to Example 6 of the present invention.

First, a sheet-like dielectric 21 of a glass plate is interposed between metal electrodes 31 and electrodes 32 made of, for example, carbon, as shown in FIG. 7B. At this time, the sheet-like dielectric 21 has been melted by heating.

Next, a positive high voltages is applied to the metal electrodes 31, and a negative high voltage is applied to the carbon electrodes 32. Metal ions are drawn from the positive metal electrodes 31 to the negative carbon electrodes 32. Thus, conductive portions 22F having a conductivity in the thickness direction of the sheet-like dielectric 21 are obtained, thereby forming a dielectric sheet 20F.

In the dielectric sheet 20F of Example 6, the conductive portions 22F are formed from the movement of the metal ions.

The strips of conductive films each having a prescribed width are formed on one or both sides of the dielectric sheet produced by any of the production methods according to Examples 3 to 6, whereby such a dielectric sheet as described in Example 1 or 2 can be obtained. The dielectric sheet thus obtained is used to produce a plasma addressed liquid crystal panel, a plasma addressed liquid crystal display device and the like.

Example 7

A plasma addressed liquid crystal display device according to Example 7 will now be described with reference to FIG. 8. It should be noted that the same reference numerals and characters denote the same parts in FIGS. 8 and 27.

In the present example, the structure of the plasma addressed liquid crystal display device will be sequentially described according to the order of the production steps.

First, a glass having a single opening for discharging air (i.e., a discharge port) and having a thickness of about 2 mm is used as a glass substrate 4 which is to be provided to face a dielectric sheet 20 with plasma discharge channels 17 interposed therebetween. Ni paste is applied to a surface of the glass substrate 4 by a screen printing method. Then, the resultant glass substrate 4 is baked, whereby alternating strips of anode electrodes 14 and cathode electrodes 12 are formed. It should be noted that, prior to the formation of the anode electrodes 14 and the cathode electrodes 12, an underlying film 13 is formed on that surface of the glass substrate 4 on which the anode electrode 14 and the cathode electrode 12 are to be formed.

Next, glass paste is applied on the anode electrodes 14 several times by a screen printing method. Then, a baking process is conducted, whereby partition walls 5 having a height of about 200 $\mu$m are formed.

Then, the partition walls 5 are polished to obtain a uniform height. A glass frit is applied along a periphery of the dielectric sheet 20, whereby the dielectric sheet 20 having conductive portions 22 and a conductive film 23a, which is produced by any of the above-mentioned production methods, is attached to the partition walls 5. Thereafter, a baking process is conducted. Although the dielectric sheet 20 having only the conductive film 23a is shown in the present example, the dielectric sheet 20 may additionally have a conductive film 23b.

Thereafter, air is discharged to about $10^{-6}$ Torr from the discharge port formed in the glass substrate 4, and a rare gas (which may include Hg) is introduced therethrough to several tens of Torr.

Then, an alignment film 15 is applied to a surface of the dielectric film 20. The alignment film 15 is baked and rubbed thereafter. Thus, a plasma cell substrate 1a is produced.

Next, a counter substrate 1b' is produced as follows: strips of signal electrodes 8 of indium tin oxide (ITO) are formed on a glass substrate 10 serving as a color filter substrate, so as to correspond to the red (R), green (G) and blue (B) picture elements. The signal electrodes 8 are used for writing a signal. Thereafter, a non-display portion of the glass substrate 10 is drilled to form two openings for injecting a liquid crystal material. Then, an alignment film 16 is applied to the signal electrode (ITO) side of the glass substrate 10. Then, the alignment film 16 is baked and rubbed. The counter substrate 1b' thus obtained may alternatively be produced prior to the production of the plasma cell substrate 1a.

Then, a spacer (not shown) for maintaining a cell thickness is provided either over the glass substrate 10 of the counter substrate 1b' or over the dielectric sheet 20 of the plasma cell substrate 1a. The plasma cell substrate 1a and the counter substrate 1b' are attached to each other such that the signal electrodes 8 are substantially perpendicular to the partition walls 5.

Thereafter, air is discharged from the two openings formed in the glass substrate 10 of the counter substrate 1b' and a liquid crystal material is introduced therethrough in order to form a liquid crystal layer 7. These openings are then sealed with a sealing material. Thereafter, heating is conducted to re-align the liquid crystal material. Thus, the plasma addressed liquid crystal panel is completed.

Comparative example

A plasma addressed liquid crystal panel as a comparative example was produced as follows:

First, a glass having a single opening for discharging air (i.e., a discharge port) and having a thickness of about 2 mm was used as a glass substrate which is to be provided to face a dielectric sheet with plasma discharge channels interposed therebetween. Ni paste was applied to the glass substrate by a screen printing method. Then, the resultant glass substrate was baked, whereby alternating strips of anode electrodes and cathode electrodes were formed.

Next, glass paste was applied on the anode electrodes several times by a screen printing method. Then, a baking process was conducted, whereby partition walls having a height of about 200 µm were formed.

Then, the partition walls were polished to obtain a uniform height. A glass frit was applied along a periphery of the thin plate glass, whereby a thin plate glass having a thickness of about 50 µm was attached to the partition walls. Then, a baking process was conducted.

Thereafter, air was discharged to about $10^{-6}$ Torr from the discharge port formed in the glass, and a rare gas (which may include Hg) was introduced therethrough to several tens of Torr.

Then, an alignment film is applied to the thin plate glass. The alignment film is baked and rubbed thereafter. Thus, a plasma cell substrate was produced.

Next, a liquid crystal cell section was produced as follows: strips of signal electrodes of indium tin oxide (ITO) were formed on a glass substrate so as to correspond to the red (R), green (G) and blue (B) picture elements. The signal electrodes are used for writing a signal. Thereafter, a non-display portion of the glass substrate was drilled to form two openings for introducing a liquid crystal material. Then, an alignment film was applied to the signal electrode (ITO) side of the glass substrate. Then, the alignment film is baked and rubbed.

Then, a spacer (not shown) for maintaining a cell thickness was provided either over the counter substrate of the liquid crystal cell section or over the dielectric sheet of the plasma cell substrate. The plasma cell substrate and the counter substrate were attached to each other such that the signal electrode were substantially perpendicular to the partition walls.

Thereafter, air was discharged from the two openings formed in the glass substrate of the counter substrate, and a liquid crystal material is introduced therethrough. These openings were then sealed with a sealing material. Thereafter, heating was conducted to re-align the liquid crystal. Thus, the plasma addressed liquid crystal panel as the comparative example was completed.

Experiment

For the plasma addressed liquid crystal panels thus produced according to Example 7 and the comparative example, the relationship between a transmittance and a data voltage was obtained by causing a plasma discharge. A brightness saturation voltage and a threshold voltage were measured using a measuring apparatus LCD-5100 (made by Otsuka Denshi Kabushiki Kaisha) The result is shown in Table 1.

TABLE 1

| Item | Present invention | Comparative example |
|---|---|---|
| Brightness-saturation voltage | 5 V | 80 V |
| Threshold voltage | 1 V | 10 V |

As can be seen from Table 1, the comparative example has high brightness-saturation voltage and threshold voltage of 80 V and 10 V, respectively. According to the present invention, the brightness-saturation voltage and the threshold voltage were able to be reduced to 5 V and 1 V, respectively.

Figure 8:
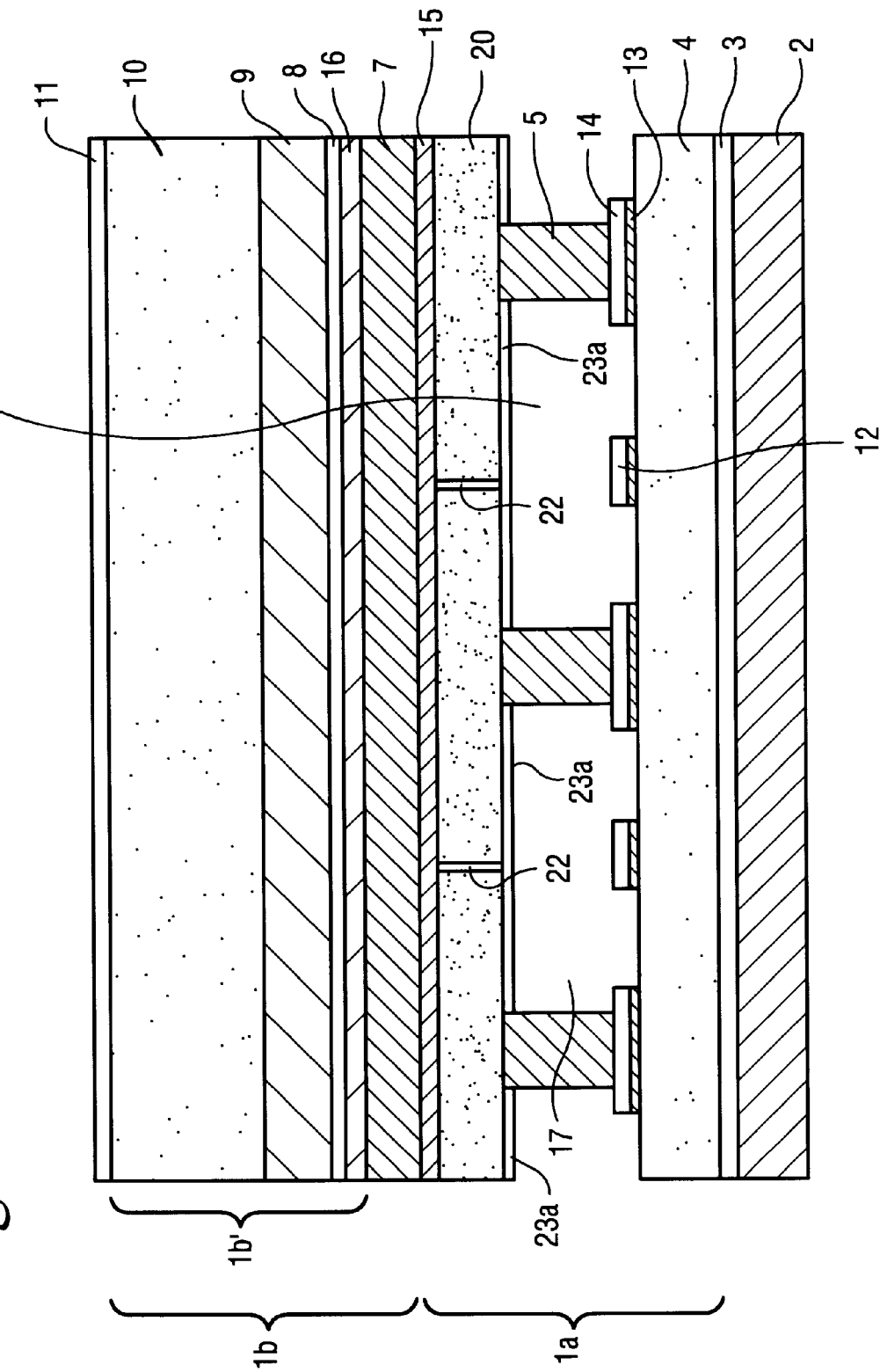
FIG. 8 is a cross sectional view of a plasma addressed liquid crystal display device (PALC) according to Example 7 of the present invention.

As shown in FIG. 8, polarizing plates 3 and 11 are provided to interpose the above-mentioned plasma addressed liquid crystal panel so that their polarization axes correspond to the respective rubbing directions. Furthermore, a backlight 2 is provided on an outer surface of the polarizing plate 3. Thus, the plasma addressed liquid crystal display device of the present invention is completed.

In the plasma addressed liquid crystal display device of the present invention, a phase plate (not shown) may additionally be provided between the glass substrate 10 serving as a color filter substrate and the polarizing plate 11 provided on the glass substrate 10, or between the other polarizing plate 3 and the plasma cell substrate 1a. With such a structure, the viewing-angle characteristics can be advantageously improved.

Although a transmission-type plasma addressed liquid crystal display device has been described above in Examples of the present invention, the dielectric sheet of the present invention can also be used in a reflection-type plasma addressed liquid crystal display device. In the case where the dielectric sheet of the present invention is used in the reflection-type plasma addressed liquid crystal display device, the dielectric sheet need not be formed from a material which transmits visible light, and can be formed from a metal material such as aluminum (Al). Furthermore, a reflecting plate may additionally be provided on that surface of the dielectric sheet which faces the liquid crystal layer.

As has been described above in detail, according to the present invention, a conductive portion having a conductivity in a thickness direction of a dielectric sheet is continuously or discontinuously formed in the dielectric sheet. Moreover, at least one end of the conductive portion is electrically connected to a strip-shaped conductive film formed with a prescribed width on a surface of the dielectric sheet. Therefore, in the case where the conductive film is located on a plasma discharge channel side, charges are uniformly distributed at a virtual electrode, and the surface uniformity of the voltage application to a liquid crystal layer corresponding to the pixels can be achieved. Accordingly, a surface distribution of the luminance in the plasma addressed liquid crystal display device is eliminated. Moreover, non-uniformity of the luminance causing an undesirable display is eliminated, whereby the display quality is improved. In a plasma addressed liquid crystal display device using this dielectric sheet, a sufficient contrast can be achieved by driving the liquid crystal even with a low voltage such as several volts. As a result, the power consumption is reduced. Moreover, it is sufficient for a driver to withstand a voltage up to several volts, thereby eliminating the need for a special semiconductor process for achieving a high-voltage resistance. Therefore, the cost required for the drive is reduced.

Furthermore, a data voltage corresponding to an image signal is applied to the liquid crystal layer through the conductive film formed on the plasma discharge channel side of the dielectric sheet, instead of through a charge pattern formed at the virtual electrode. As a result, crosstalk resulting from the lacteral expansion of the charge pattern is eliminated.

Example 8

Figure 9:
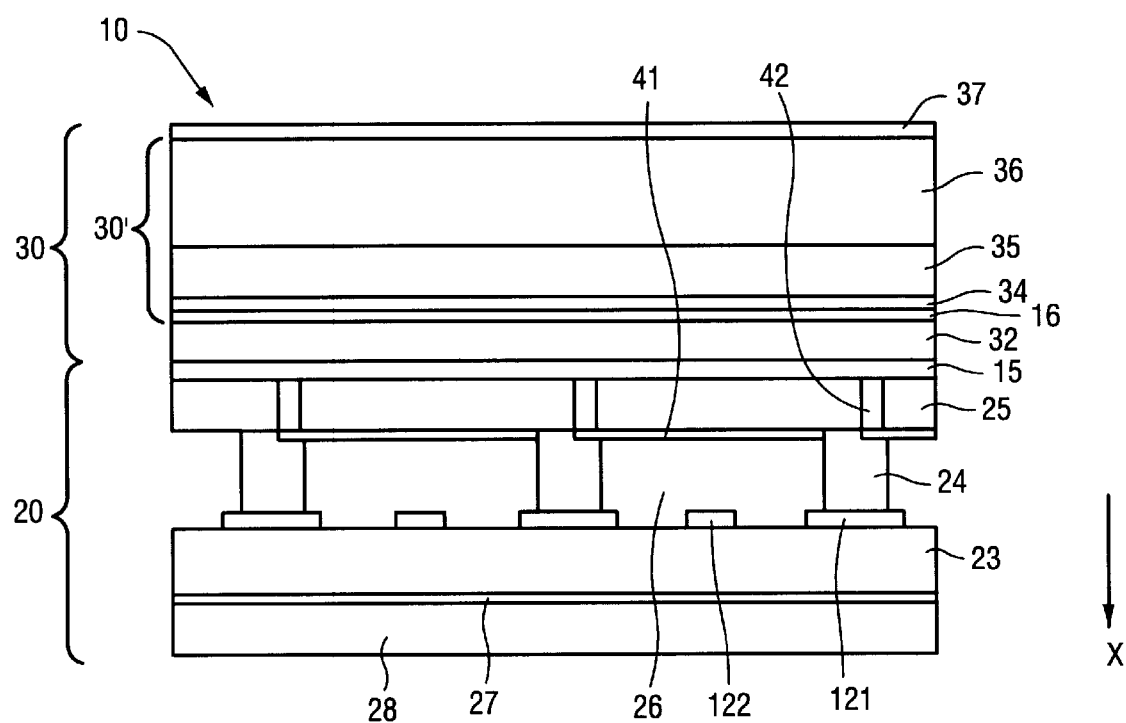
FIG. 9 is a cross sectional view of a plasma addressed liquid crystal display device (PALC) according to Example 8 of the present invention.
Figure 10:
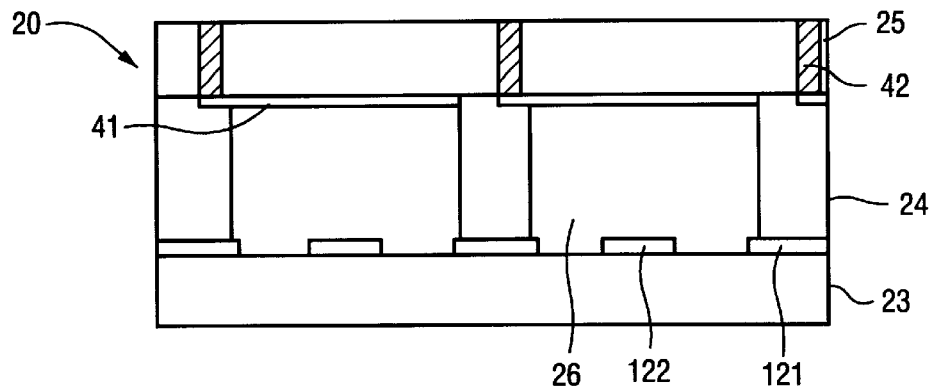
FIG. 10 is a cross sectional view of a plasma cell substrate of the PALC shown in FIG. 9.
Figure 11:
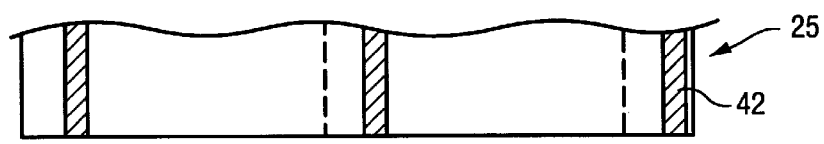
FIG. 11 is a partial top plan view of a dielectric sheet of the plasma cell substrate shown in FIG. 10.

FIG. 9 is a cross sectional view of a plasma addressed liquid crystal display device (PALC) 10 according to Example 8 of the present invention. The PALC 10 has a plasma switching section (plasma cell substrate) 20 and a liquid crystal section 30 including a counter substrate 30'. FIG. 10 is a cross sectional view of the plasma cell substrate 20 of the PALC 10, and FIG. 11 is a partial top plan view of the plasma cell substrate 20 in FIG. 10. The plasma cell substrate 20 includes anode electrodes 121, cathode electrodes 122, a substrate 23, partition walls 24 and a dielectric sheet 25.

Alternating strips of anode electrodes 121 and cathode electrodes 122 are formed on the substrate 23. The partition walls 24 are provided on the respective anode electrodes 121. Each cathode electrode 122 is separated from the adjacent cathode electrode 122 by the corresponding partition wall 24. A plasma discharge channel 26 is formed as a region surrounded by the dielectric sheet 25, the substrate 23 and the partition walls 24. After being evacuated into a vacuum state, the plasma discharge channel 26 is filled with a rare gas (which may include Hg) in order to cause a plasma discharge in the plasma discharge channel 26. The substrate 23 has at least one opening for discharging air from the plasma discharge channel 26 into a vacuum state (i.e., a discharge port). It should be noted that the plasma cell substrate 20 may additionally include a polarizing plate 27 and/or a surface-emitting backlight 28.

Hereinafter, a structure of the dielectric sheet 25 will be described.

The dielectric sheet 25 has a first surface and a second surface which is opposite to the first substrate. Conductors 42 of a material such as a metal is formed between the first surface and the second surface so as to extend through the dielectric sheet 25. The conductors 42 correspond to the pixels.

Transparent electrodes 41 are formed on the second surface of the dielectric sheet 25. The electrodes 41 are formed by depositing indium tin oxide (ITO) on the second surface by a vapor deposition method and patterning the resultant ITO. The electrode 41 correspond to the pixels. Moreover, each electrode 41 is electrically connected to the corresponding conductor 42. It should be noted that an alignment film 15 is formed on the first surface of the dielectric sheet 25.

In the present example, the substrate 23 is a glass substrate having a thickness of about 2 μm. The dielectric sheet 25 is formed of a glass plate. Preferably, the dielectric sheet 25 is an anisotropic conductive glass plate.

The liquid crystal section 30 includes a liquid crystal layer 32, signal electrodes 34, a color filter layer 35, a substrate 36 and a polarizing plate 37.

A black matrix (not shown) and the color filter layer 35 are provided on the substrate 36. The signal electrodes 34 are provided on the color filter layer 35. The signal electrodes 34 are formed from indium tin oxide. The liquid crystal 32 is introduced between the signal electrodes 34 and the dielectric sheet 25 of the plasma cell substrate 20.

Hereinafter, a method for producing the plasma cell substrate 20 will be described.

The alternating strips of the anode electrodes 121 and the cathode electrodes 122 are formed on the substrate 23. Ni paste is applied to the substrate 23, and thereafter, the resultant substrate 23 is baked, whereby the anode electrode 121 and the cathode electrodes 122 are formed. Ni paste may be applied to the substrate 23 by a screen printing method.

Then, glass paste is applied to the anode electrodes 121 several times by a screen printing method, and thereafter, a baking process is conducted. Thus, the partition walls 24 having a height of about 200 μm are formed.

The partition walls 24 are then polished to obtain a uniform height.

A glass frit is applied along a periphery of the dielectric sheet 25 in order to attach the partition walls 24 and the dielectric sheet 25 to each other. The partition walls 24 and the dielectric sheet 25 are attached to each other so that the conductors 42 each serving as a light-shielding portion of the dielectric sheet 25 are located on the respective partition walls 42. A baking process is conducted thereafter. Then, air is discharged from the plasma discharge channel 26 to about $10^{-6}$ Torr through the discharge port formed in the substrate 23. Thereafter, a rare gas (which may include Hg) is introduced therethrough into the plasma discharge channel 26 to several tens of Torr. Finally, the discharge port is closed.

Hereinafter, a method for producing the liquid crystal cell section 30 will be described.

A black matrix (not shown) and the color filter layer 35 are formed on the substrate 36. The strips of the signal electrodes 34 are formed on the color filter layer 35 so as to correspond to the red (R), green (G) and blue (B) picture elements. The signal electrodes 34 are arranged to be substantially perpendicular to the partition walls 24 when the plasma cell substrate 20 and the counter substrate 30' are attached to each other.

Alignment films 15 and 16 are respectively applied to the signal electrodes 34 and the dielectric sheet 25 of the plasma cell substrate 20. Then, the alignment films 15 and 16 are baked and rubbed. At least two openings for discharging air in preparation for introducing a liquid crystal material are formed in the substrate 36 serving as a color filter substrate. An opening(s) for introducing the liquid crystal material is formed in a non-displaying portion of the substrate 36. The plasma cell substrate 20 and the counter substrate 30' are attached to each other such that the respective rubbing directions are substantially perpendicular to each other. At this time, a spacer (not shown) is provided between the signal electrode 34 of the counter substrate 30' and the dielectric sheet 25 of the plasma cell substrate 20 so that a prescribed gap is maintained therebetween. Then, the liquid crystal material 32 is introduced between the signal electrodes 34 and the dielectric sheet 25. Thereafter, the liquid crystal 32 is sealed with a sealing material. Then, the liquid crystal 32 is heated to be re-aligned.

The dielectric sheet 25 has a first surface and a second surface which is opposite to the first surface. The alignment film is formed on the first surface, whereas the transparent electrodes 41 are formed on the second surface. The transparent electrodes 41 are formed by depositing Indium tin oxide (ITO) on the second surface by a vapor deposition method and patterning the resultant ITO. The electrodes 41 thus formed correspond to the pixels. The dielectric sheet 25 further includes the conductors 42. Each conductor 42 is electrically connected to the corresponding electrode 41.

Regarding the relationship between data voltage and transmittance, the PALC 10 of Example 8 and PALC-100 were compared. Note that PALC-100 is a newly-designed plasma addressed liquid crystal display device which was additionally produced by the inventor of the present invention in order to conduct this experiment.

Hereinafter, the structure of PALC-100 will be described.

A substrate having a thickness of about 2 mm and having a single opening for discharging air (i.e., a discharge port) was used a substrate of PALC-100.

The alternating strips of anode electrodes and cathode electrodes were formed by applying of Ni paste on the substrate by a screen printing method and baking the resultant substrate. Next, glass paste was applied on the anode electrode several times by a screen printing method. Then, a baking process was conducted, whereby partition walls having a height of about 200 μm were formed. Then, the partition walls were polished to obtain a uniform height. A glass frit was applied along a periphery of the thin plate glass having a thickness of about 50 μm, whereby the thin plate glass was attached to the partition walls. Thereafter, a baking process was conducted. Air was discharged to about $10^{-6}$ Torr through the discharge port formed in the substrate, and a rare gas (which may include Hg) was introduced therethrough to several tens of Torr. Then, an alignment film is applied to the thin plate glass. The alignment film is baked and rubbed. Thus, a plasma cell substrate of PALC-100 was produced.

Since the structure of a liquid crystal cell section of PALC-100 is the same as that of the liquid crystal cell section 30 of Example 8, description thereof will be omitted.

A brightness saturation voltage and a data voltage were measured by the measuring apparatus LCD-5100 (made by Otsuka Denshi Kabushik Kaisha). The result is shown in Table 2.

TABLE 2

| Item | PALC 10 | PALC 100 |
| --- | --- | --- |
| Brightness-saturation voltage | 5 V | 80 V |
| Threshold voltage | 1 V | 10 V |

In the PALC 10 of Example 8, the dielectric sheet 25 having a conductivity only in the thickness direction thereof is used at the boundary between the liquid crystal portion and the plasma generating portion. Therefore, one end of the liquid crystal layer 32 is at a ground potential, whereby a data voltage will be directly applied to the liquid crystal layer 32. Accordingly, the liquid crystal can be driven by a low voltage such as several volts, making it possible to reduce the power consumption, as compared to PALC-100. Furthermore, it is sufficient for a driver for applying a voltage to the signal electrodes 34 to withstand a voltage up to several volts. Accordingly, a driver capable of withstanding a low voltage can be used in Example 8, thereby eliminating the need for a special semiconductor process for achieving the high-voltage resistance.

The dielectric sheet 25 includes the conductors 42 and the electrodes 41. Therefore, the thickness of the dielectric sheet 25 need not be reduced, thereby making it possible for the dielectric sheet 25 to have a sufficient thickness to prevent distortion of the dielectric sheet 25. Accordingly, a cell thickness and a retardation will not be shifted from their design values. Moreover, defective orientation of the liquid crystal resulting from the distortion of the dielectric sheet 25 is eliminated. Furthermore, since the conductors 42 of the dielectric sheet 25 are located on the partition walls 24, the numerical aperture will not be reduced.

Example 9

The structure of a plasma addressed liquid crystal display device (PALC) according to Example 9 of the present invention is the same as that of the PALC 10 of Example 8 except for the structure of a dielectric sheet 50 of a plasma cell substrate 20.

Figure 12:
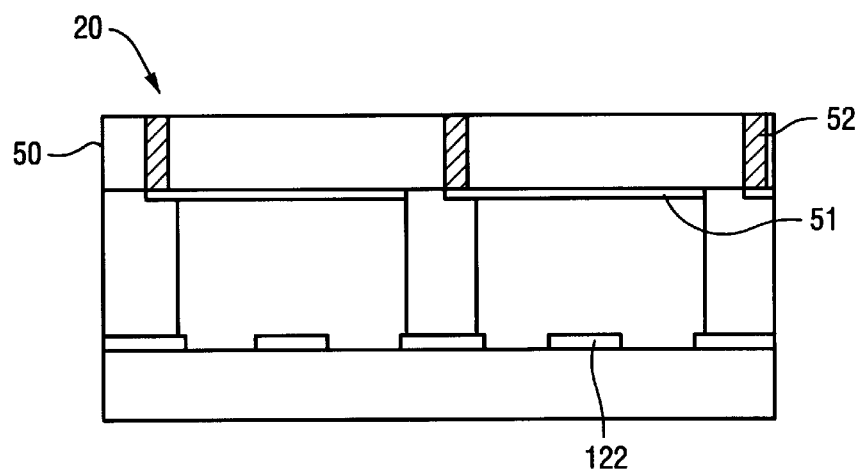
FIG. 12 is a cross sectional view of a plasma cell substrate of a plasma addressed liquid crystal display device (PALC) according to Example 9 of the present invention.
Figure 13:
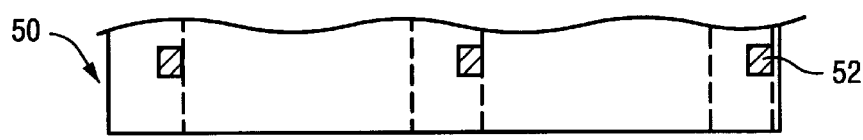
FIG. 13 is a partial top plan view of a dielectric sheet of the plasma cell substrate shown in FIG. 12.

Hereinafter, the structure of the dielectric sheet 50 of Example 9 will be described. FIG. 12 is a cross sectional view of the plasma cell substrate 20 of the PALC according to Example 9. FIG. 13 is a partial top plan view of the dielectric sheet 50 in FIG. 12. The same reference numerals denote the same parts in Example 8 (FIGS. 9 through 11) and Example 9 (FIGS. 12 and 13), and description thereof will be omitted.

The dielectric sheet 50 has a first surface and a second surface which is opposite to the first surface. Bar-shaped conductors 52 of a material such as a metal are formed between the first surface and the second surface so as to extend through the dielectric sheet 50. The conductors 52 extend toward the cathode electrodes, and are spaced apart from each other so as to correspond to the pixels.

Transparent electrodes 51 are formed on the second surface of the dielectric sheet 50. The electrodes 51 are formed by depositing indium tin oxide (ITO) on the second surface by a vapor deposition method and patterning the resultant ITO. The electrodes 51 correspond to the pixels. Moreover, each electrode 51 is electrically connected to the corresponding conductor 52. It should be noted that an alignment film is formed on the first surface of the dielectric sheet 50, as in the case of Example 8.

With such a structure, Example 9 has similar effects to those of Example 8.

Example 10

The structure of a plasma addressed liquid crystal display device (PALC) according to Example 10 of the present invention is the same as that of the PALC 10 of Example 8 except for the structure of a dielectric sheet 60 of a plasma cell substrate 20.

Figure 14:
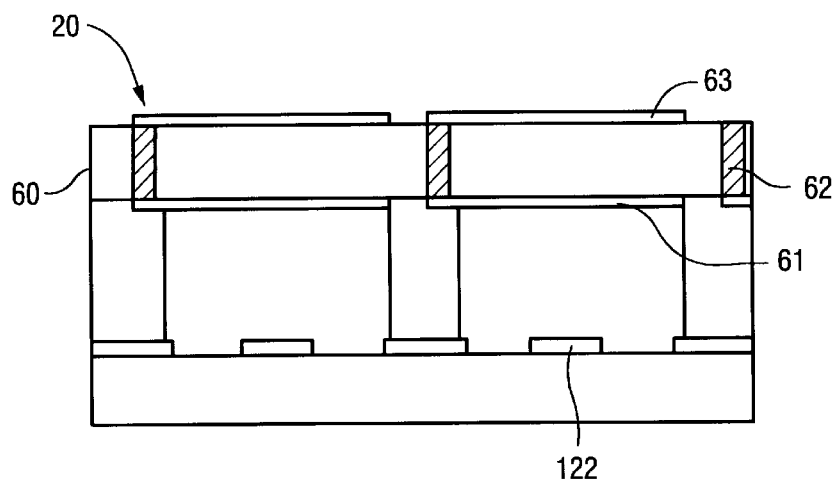
FIG. 14 is a cross sectional view of a plasma cell substrate of a plasma addressed liquid crystal display device (PALC) according to Example 10 of the present invention.
Figure 15:
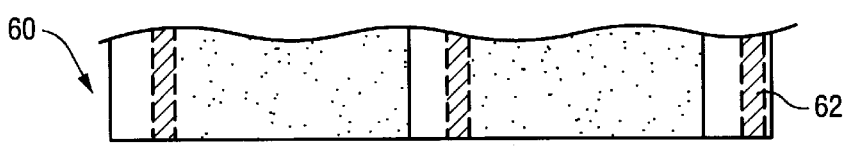
FIG. 15 is a partial top plan view of a dielectric sheet of the plasma cell substrate shown in FIG. 14.

Hereinafter, the structure of the dielectric sheet 60 of Example 10 will be described. FIG. 14 is a cross sectional view of the plasma cell substrate 20 of the PALC according to Example 10. FIG. 15 is a partial top plan view of the dielectric sheet 60 in FIG. 14. The same reference numerals denote the same parts in Example 8 (FIGS. 9 through 11) and Example 10 (FIGS. 14 and 15), and description thereof will be omitted.

The dielectric sheet 60 has a first surface and a second surface which is opposite to the first surface. Conductors 62 of a material such as a metal are formed between the first surface and the second surface so as to extend through the dielectric sheet 60. The conductors 62 correspond to the pixels.

Transparent electrodes 63 and 61 are formed on the first and second surfaces of the dielectric sheet 60, respectively. The electrodes 63 and 61 are formed by depositing indium tin oxide (ITO) on the first and second surfaces by a vapor deposition method and patterning the resultant ITO. The electrodes 63 and 61 correspond to the pixels. Moreover, each electrode 63 on the first surface is electrically connected to the corresponding electrode 61 on the second surface through the corresponding conductor 62. It should be noted that an alignment film is formed on the first surface of the dielectric sheet 60 having the electrodes 63 thereon, as in the case of Example 8. The patterning for forming the electrodes 63 and 61 may be conducted by a photolithography technique.

With such a structure, Example 10 has similar effects to those of Example 8.

Example 11

The structure of a plasma addressed liquid crystal display device (PALC) according to Example 11 of the present invention is the same as that of the PALC 10 of Example 8 except for the structure of a dielectric sheet 70 of a plasma cell substrate 20.

Figure 16:
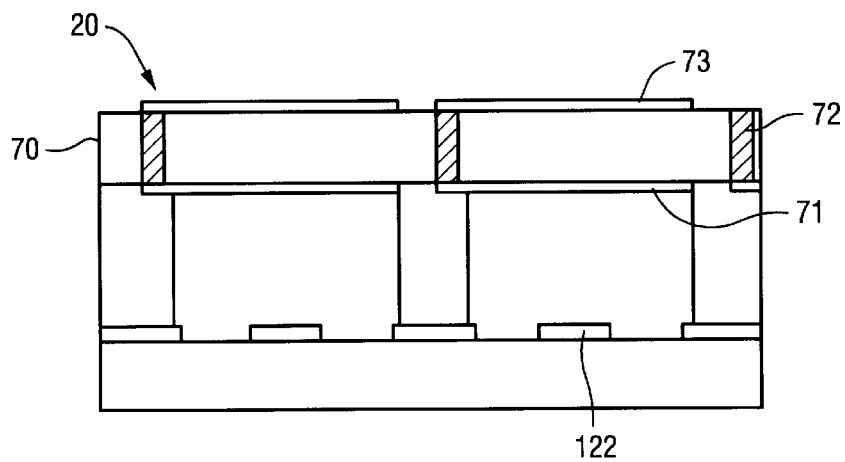
FIG. 16 is a cross sectional view of a plasma cell substrate of a plasma addressed liquid crystal display device (PALC) according to Example 11 of the present invention.
Figure 17:
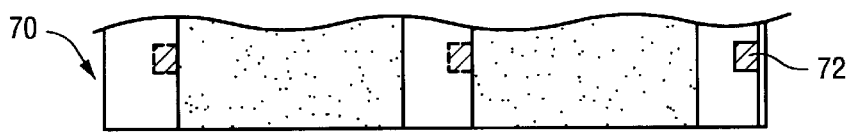
FIG. 17 is a partial top plan view of a dielectric sheet of the plasma cell substrate shown in FIG. 16.

Hereinafter, the structure of the dielectric sheet 70 of Example 11 will be described. FIG. 16 is a cross sectional view of the plasma cell substrate 20 of the PALC according to Example 11. FIG. 17 is a partial top plan view of the dielectric sheet 70 in FIG. 16. The same reference numerals denote the same parts in Example 8 (FIGS. 9 through 11) and Example 11 (FIGS. 16 and 17), and description thereof will be omitted.

The dielectric sheet 70 has a first surface and a second surface which is opposite to the first surface. Bar-shaped conductors 72 of a material such as a metal are formed between the first surface and the second surface so as to extend through the dielectric sheet 70. The conductors 72 extend toward the cathode electrodes, and are spaced apart from each other so as to correspond to the pixels.

Transparent electrodes 73 and 71 are formed on the first and second surfaces of the dielectric sheet 70, respectively. The electrodes 73 and 71 are formed by depositing indium tin oxide (ITO) on the first and second surfaces by a vapor deposition method and patterning the resultant ITO. The electrodes 73 and 71 correspond to the pixels. Moreover, each electrode 73 on the first surface is electrically connected to the corresponding electrode 71 on the second surface through the corresponding conductor 72. It should be noted that an alignment film is formed on the first surface of the dielectric sheet 70 having the electrodes 73 thereon, as in the case of Example 8. The patterning for forming the electrodes 73 and 71 may be conducted by a photolithography technique.

With such a structure, Example 11 has similar effects to those of Example 8.

Example 12

The structure of a plasma addressed liquid crystal display device (PALC) according to Example 12 of the present invention is the same as that of the PALC 10 of Example 8 except for the structure of a dielectric sheet 80 and partition walls 84 of a plasma cell substrate 20.

Figure 18:
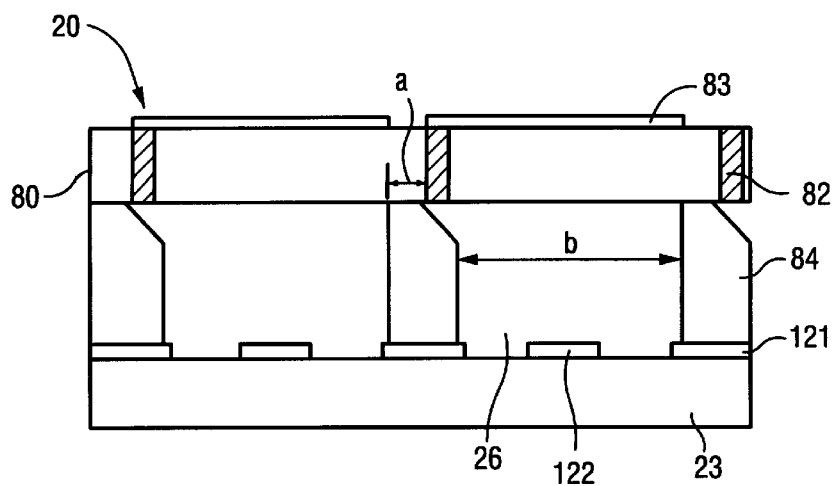
FIG. 18 is a cross sectional view of a plasma cell substrate of a plasma addressed liquid crystal display device (PALC) according to Example 12 of the present invention.
Figure 19:
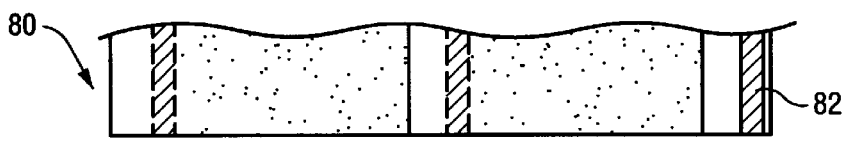
FIG. 19 is a partial top plan view of a dielectric sheet of the plasma cell substrate shown in FIG. 18.

Hereinafter, the structure of the dielectric sheet 80 and the partition walls 84 of Example 12 will be described. FIG. 18 is a cross sectional view of the plasma cell substrate 20 of the PALC according to Example 12. FIG. 19 is a partial top plan view of the dielectric sheet 80 in FIG. 18. The same reference numerals denote the same parts in Example 8 (FIGS. 9 through 11) and Example 12 (FIGS. 18 and 19), and description thereof will be omitted.

The dielectric sheet 80 has a first surface and a second surface which is opposite to the first surface. Conductors 82 of a material such as a metal are formed between the first surface and the second surface so as to extend through the dielectric sheet 80. The conductors 82 correspond to the pixels.

Transparent electrodes 83 are formed on the first surface of the dielectric sheet 80. The electrodes 83 are formed by depositing indium tin oxide (ITO) on the first surface by a vapor deposition method and patterning the resultant ITO. The electrodes 83 correspond to the pixels. Moreover, each electrode 83 on the first surface is electrically connected to the corresponding conductor 82.

As in the case of Example 8, alternating strips of anode electrodes 121 and cathode electrodes 122 are formed on a substrate 23. Partition walls 84 are formed on the respective anode electrodes 121. Each cathode electrode 122 is separated from the adjacent cathode electrode 122 by the corresponding partition wall 84. With portions a and b of the substrate 23 being masked, notches are formed by a sandblasting method. The dielectric sheet 80 and the partition walls 84 are attached to each other so that the conductors 82 of the dielectric sheet 80 are located on the notches. Thus, a plasma discharge channel 26 is formed. The plasma discharge channel 26 is evacuated to a vacuum state, and thereafter, a rare gas (which may include Hg) is introduced thereinto. Since the conductors 82 are located on the notches, it is not necessary to provide an electrode on the second surface of the dielectric sheet 80. It should be noted that an alignment film is formed on the first surface of the dielectric sheet 80 having the electrode 83 thereon, as in the case of Example 8.

In the above description, a notch is formed at each of the partition walls, and the conductors 82 are located to correspond to the respective notches. Alternatively, at least one of the plurality of partition walls may have a notch, and the conductors between the first and second surfaces may be located on the partition walls so as to correspond to the respective partition walls. In this case, the conductors between the first and second surfaces are located on the partition walls such that each notch is located under the corresponding conductor.

With such a structure, Example 12 has similar effects of those of Example 8.

Example 13

The structure of a plasma addressed liquid crystal display device (PALC) according to Example 13 of the present invention is the same as that of the PALC 10 of Example 12 except for the structure of a dielectric sheet 90 of a plasma cell substrate 20.

Figure 20:
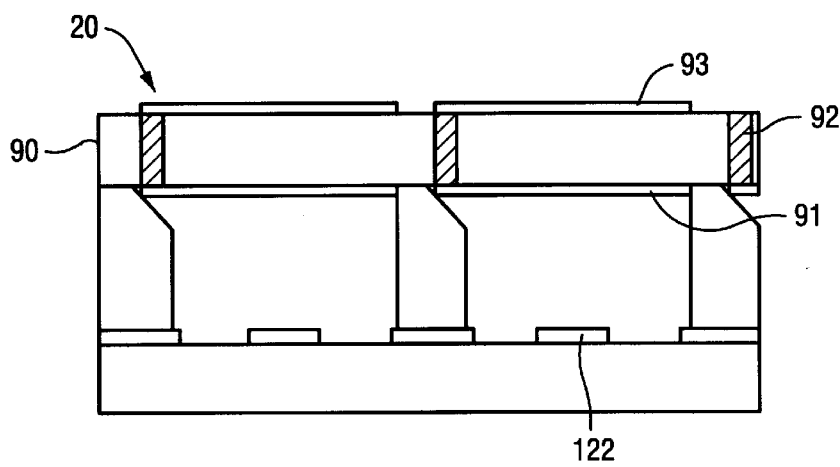
FIG. 20 is a cross sectional view of a plasma cell substrate of a plasma addressed liquid crystal display device (PALC) according to Example 13 of the present invention.
Figure 21:
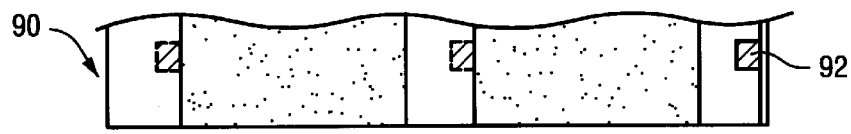
FIG. 21 is a partial top plan view of a dielectric sheet of the plasma cell substrate shown in FIG. 20.

Hereinafter, the structure of the dielectric sheet 90 of Example 13 will be described. FIG. 20 is a cross sectional view of the plasma cell substrate 20 of the PALC according to Example 13. FIG. 21 is a partial top plan view of the dielectric sheet 90 in FIG. 20. The same reference numerals denote the same parts in Example 12 (FIGS. 18 and 19) and Example 13 (FIGS. 20 and 21), and description thereof will be omitted.

The dielectric sheet 90 has a first surface and a second surface which is opposite to the first surface. Bar-shaped conductors 92 of a material such as a metal is formed between the first surface and the second surface so as to extend through the dielectric sheet 90. The conductors 92 extend toward cathode electrodes, and are spaced apart from each other so as to correspond to the pixels.

Transparent electrodes 91 and 93 are formed on the surfaces of the dielectric sheet 90. The electrodes 91 and 93 are formed in the same manner as that of the electrodes 71 and 73 of Example 11. Each pair of electrodes 91 and 93 are electronically connected to the corresponding conductor 92.

With such a structure, Example 13 has similar effects to those of Example 12.

Example 14

Hereinafter, an exemplary method for producing the dielectric sheets 50, 70 and 90 will be described with reference to FIGS. 22A through 22C.

Figure 22A:
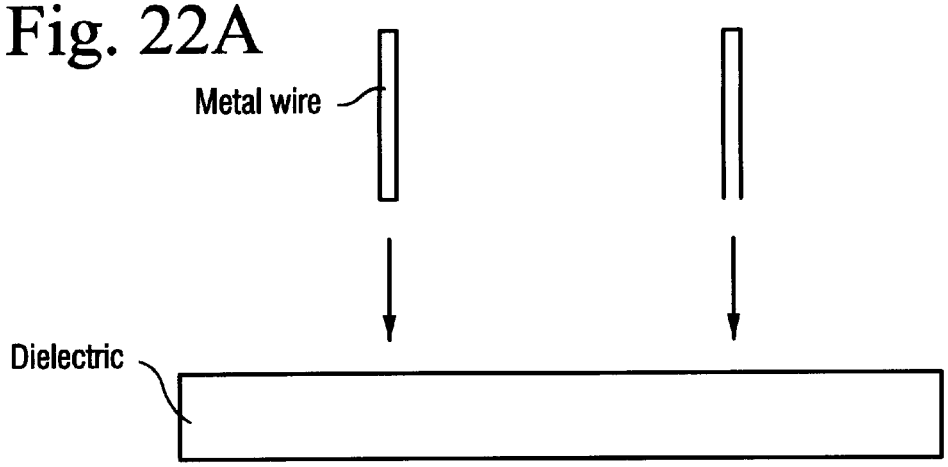
Figure 22B:
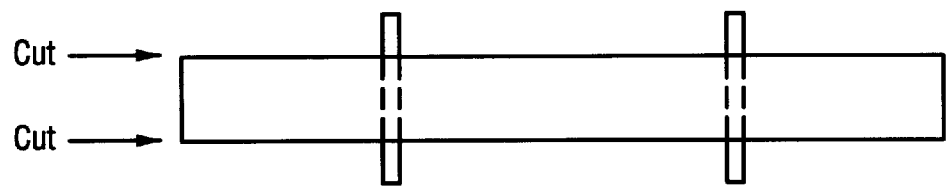
Figure 22C:
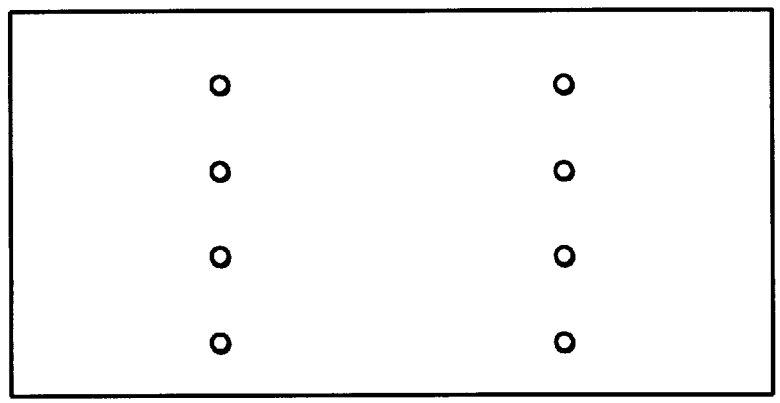

FIG. 22A is a diagram showing metal wires and a dielectric. In order that at least one metal wire corresponds to a single partition wall when the plasma cell substrate 20 is formed, a plurality of metal wires are located equally spaced apart from each other. The plurality of metal wires are securely held by an appropriate jig. The dielectric is melted by heating, and the plurality of securely held metal wires and/or the dielectric are moved to each other so that the metal wires extend through the dielectric. Thereafter, a portion of the metal wires which protrudes from the dielectric is cut, as shown in FIG. 22B. Then, both surfaces of the dielectric are polished to make these surfaces flat. Thus, the dielectric sheet is produced. FIG. 22C is a top plan view of the thus produced dielectric sheet.

Example 15

Hereinafter, an exemplary method for producing the dielectric sheets 25, 50, 60, 70, 80 and 90 will be described with reference to FIG. 23.

Figure 23:
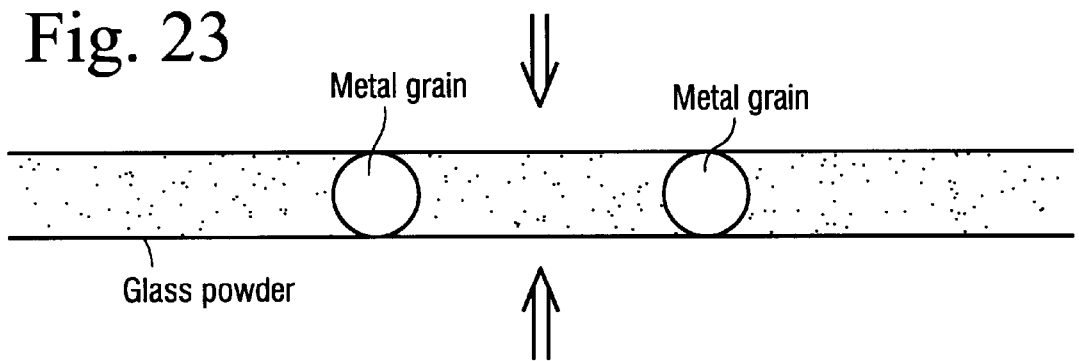
FIG. 23 is a cross sectional view of a dielectric including metal grains.

FIG. 23 is a diagram showing a dielectric including metal grains. In order that at least one metal grain corresponds to a single partition wall when the plasma cell substrate 20 is formed, a plurality of metal grains are located equally spaced apart from each other. Then, the plurality of metal grains are securely held. Glass powder is introduced between the metal grains. The resultant glass powder and metal grains are compressed at a high temperature to a desired thickness. Thus, the dielectric sheet having a desired thickness is produced.

Example 16

Hereinafter, an exemplary method for producing the dielectric sheets 50, 70 and 90 will be described with reference to FIGS. 24A through 24C.

Figure 24A:
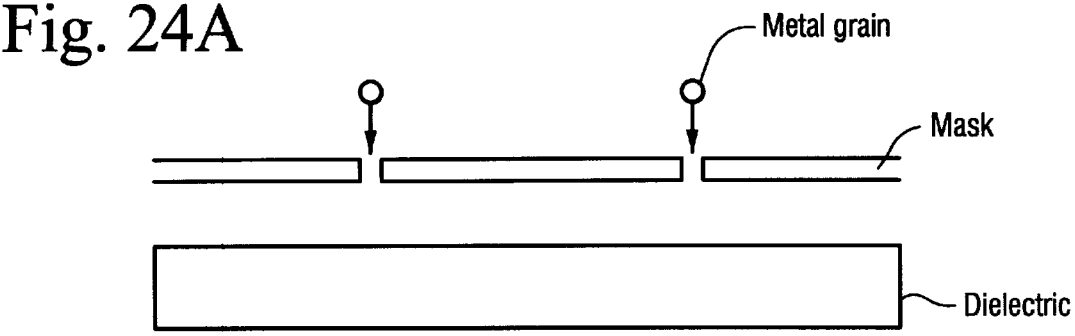
Figure 24B:
Figure 24C:
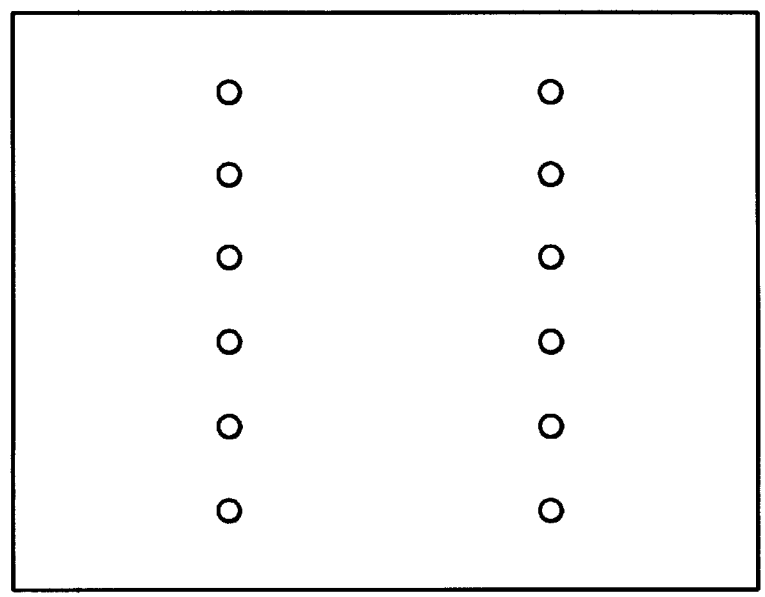

FIG. 24A is a diagram showing a mask and a dielectric. The mask has regularly arranged openings. These openings are sufficiently smaller than the pixel size. Such a mask is produced by, for example, etching. Then, the mask is aligned with the dielectric. It should be noted that, at this time, the dielectric has been melted by heating. In this state, metal grains are ejected from a cylinder, and those metal grains having passed through the openings of the mask are implanted into the dielectric. Thus, the dielectric sheet is produced. FIG. 24B is a cross sectional view of the thus produced dielectric sheet, and FIG. 24C is a top plan view thereof.

Example 17

Hereinafter, an exemplary method for producing the dielectric sheets 25, 60 and 80 will be described with reference to FIGS. 25A and 25B.

Figure 25A:
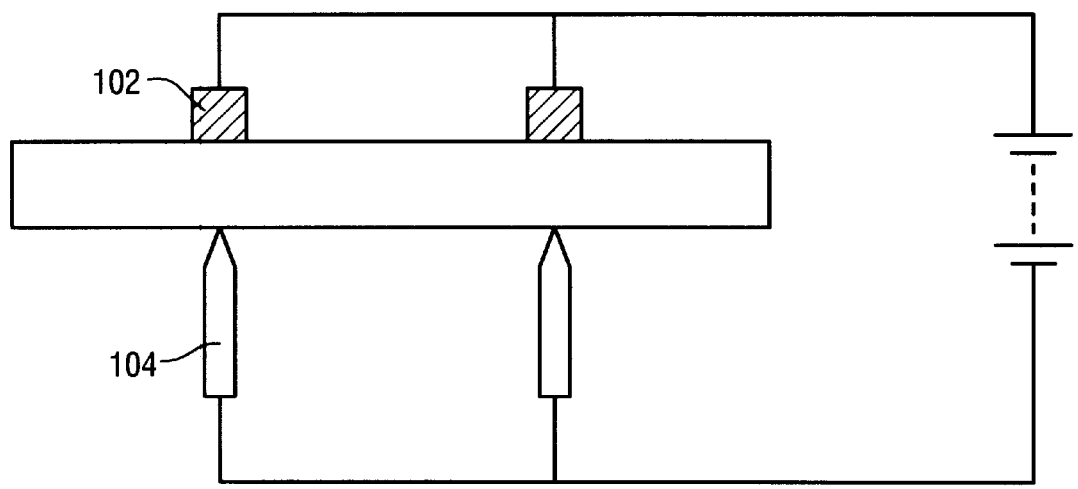
Figure 25B:
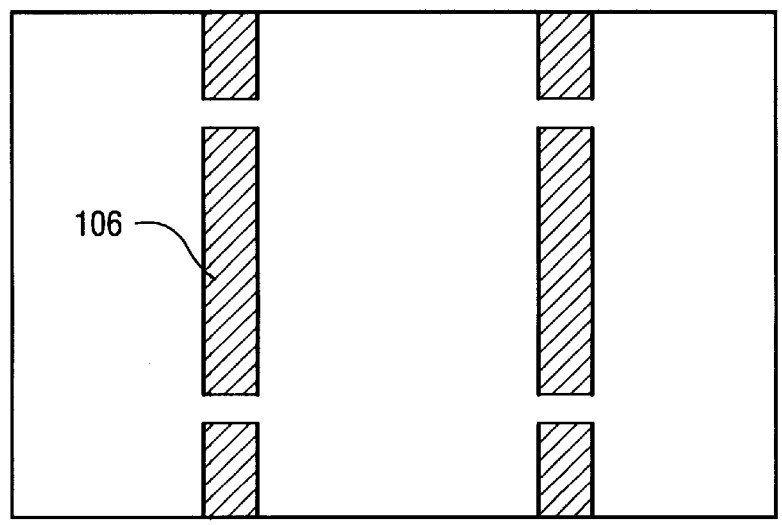

FIG. 25A is a diagram showing a melted dielectric interposed between a metal electrode 102 and a non-metal electrode 104 of, for example, carbon. FIG. 25B is a top plan view of a produced dielectric sheet. A positive high voltage is applied to the metal electrode 102, whereas a negative high voltage is applied to the non-metal (carbon) electrode 104 (e.g., a DC voltage of about 500 V between the electrodes). Metal ions are drawn from the positively charged metal electrode 102 to the negatively charged non-metal electrode 104, whereby the resultant dielectric has a conductivity in the thickness direction in conductive portions 106. Thus, the dielectric sheet is produced.

A plasma addressed liquid crystal display device according to the present invention includes a dielectric having a first surface, a second surface which is opposite to the first surface, and a conductor extending between the first and second surfaces, wherein the dielectric defines a space together with a substrate, a plurality of partition walls and the second surface. A first conductive region is formed on the second surface facing the space. The first conductive region is electrically connected to the conductor extending between the first and second surfaces. The conductor is located on a corresponding one of the plurality of partition walls.

Accordingly, the plasma addressed liquid crystal display device according to the present invention can include a dielectric having a sufficient strength without reducing the numerical aperture.

Another plasma addressed liquid crystal display device according to the present invention includes a dielectric having a first surface, a second surface which is opposite to the first surface, and conductors extending between the first and second surfaces, wherein the dielectric defines a space together with a substrate, a plurality of partition walls and the second surface. A first conductive region is formed on the first surface of the dielectric. The first conductive region is electrically connected to the conductors extending between the first and second surfaces. At least one of the plurality of partition walls has a notch, and the conductors between the first and second surfaces are located on the partition walls so as to correspond to the respective partition walls. At this time, the conductors between the first and second surfaces are located on the partition walls such that each notch is located under the corresponding conductor.

Accordingly, the other plasma addressed liquid crystal display device according to the present invention can include a dielectric having a sufficient strength without reducing the numerical aperture.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. A plasma addressed liquid crystal display device, comprising:

a plasma cell substrate;

a counter substrate;

a liquid crystal layer interposed between the plasma cell substrate and the counter substrate, the plasma cell substrate including a first substrate, a dielectric sheet provided on a side of the liquid crystal later, and a plurality of stripe-shaped discharge channels surrounded by a plurality of partition walls formed in a gap between the first substrate and the dielectric sheet, the counter substrate including a second substrate, and a plurality of stripe-shaped electrodes formed on the second substrate so as to extend perpendicularly to the plurality of stripe-shaped discharge channels, wherein each of intersection regions of the plurality of discharge channels and the plurality of stripe-shaped electrodes defines a picture-element region, wherein the dielectric sheet includes a sheet-like dielectric, a plurality of conductive portions extending between surfaces of the sheet-like dielectric which respectively face the discharge channels and the liquid crystal layer, and a plurality of first conductive layers formed on a surface of the dielectric sheet which faces the discharge channels, each of the plurality of first conductive layers being electrically connected to at least one of the plurality of conductive portions; and wherein each of the plurality of first conductive layers is at least partially located in a central area of a corresponding discharge channel.

2. A plasma addressed liquid crystal display device according to claim 1, wherein the plurality of first conductive portions are provided so as to correspond to the respective picture-element regions.

3. A plasma addressed liquid crystal display device according to claim 2, wherein the dielectric sheet has a plurality of second conductive layers on a surface of the dielectric sheet which faces the liquid crystal layer, the plurality of second conductive layers being provided so as to correspond to the respective picture element regions, and being electrically connected to the first conductive layer through at least one of the plurality of conductive portions.

4. A plasma addressed liquid crystal display device according to claim 2, wherein the plurality of conductive portions are formed outside the picture element regions.

5. A plasma addressed liquid crystal display device according to claim 4, wherein each of the plurality of conductive portions is formed in a region overlapping a corresponding one of the plurality of partition walls when viewed from a direction normal to the dielectric sheet.

6. A plasma addressed liquid crystal display device according to claim 1, wherein first and second polarizing plates are provided on respective outside surfaces of the first and second substrates with respect to the liquid crystal layer.

7. A plasma addressed liquid crystal display device according to claim 6, further comprising:

at least one phase plate is provided between the first and second polarizing plates and the liquid crystal layer.

8. A plasma addressed liquid crystal display device according to claim 1, wherein the sheet-like dielectric has first and second surfaces facing each other; wherein the plurality of conductive portions extend between the first and second surfaces of the sheet-like dielectric; and wherein the plurality of first conductive layers are formed on at least one of the first and second surfaces, each of the plurality of first conductive layers being electrically connected to at least one of the plurality of conductive portions.

9. The display of claim 8, wherein said conductive layers are provided in addition to anode electrodes and cathode electrodes supported by a substrate, said substrate also supporting said dielectric sheet.

10. A plasma addressed liquid crystal display device according to claim 1, wherein the sheet-like dielectric is formed from an inorganic material.

11. A plasma addressed liquid crystal display device according to claim 1, wherein the sheet-like dielectric is formed from a resin.

12. A display of claim 1, further comprising anode electrodes and cathode electrodes supported by said plasma cell substrate, and wherein said plurality of first conductive layers formed on a surface of the dielectric sheet are provided in addition to said anode electrodes and cathode electrodes.

13. A plasma addressed liquid crystal display device, comprising:

a plasma cell substrate;

a counter substrate;

a liquid crystal layer interposed between the plasma cell substrate and the counter substrate;

The plasma cell substrate including a first substrate, a dielectric sheet provided on a side of the liquid crystal layer, and a plurality of stripe-shaped discharge channels surrounded by a plurality of partition walls formed in a gap between the first substrate and the dielectric sheet;

the counter substrate including a second substrate, and a plurality of stripe-shaped electrodes formed on the second substrate so as to extend perpendicularly to the plurality of stripe-shaped discharge channels;

each of intersection regions of the plurality of discharge channels and the plurality of stripe-shaped electrodes defines a picture-element region;

wherein the dielectric sheet includes a sheet-like dielectric, a plurality of conductive portions extending surfaces of the sheet-like dielectric which respectively face the discharge channels and the liquid crystal layer, and a plurality of first conductive layers formed on a surface of the dielectric sheet which faces the discharge channels, each of the plurality of first conductive layers being electrically connected to at least one of the plurality of conductive portions; and wherein a plurality of said conductive portions are located in central areas of corresponding discharge channels.

14. The display of claim 13, wherein said conductive portion are non-continuously provided along lengths of respective discharge channels.

* * * * *